(12) United States Patent
Takada et al.

(10) Patent No.: US 8,332,586 B2
(45) Date of Patent: Dec. 11, 2012

(54) INFORMATION PROCESSING SYSTEM FOR MEASURING THE CACHE EFFECT IN A VIRTUAL CAPACITY

(75) Inventors: Masanori Takada, Yokohama (JP); Shuji Nakamura, Machida (JP); Kentaro Shimada, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 618 days.

(21) Appl. No.: 12/526,773

(22) PCT Filed: Mar. 30, 2009

(86) PCT No.: PCT/JP2009/001453
§ 371 (c)(1),
(2), (4) Date: Aug. 11, 2009

(87) PCT Pub. No.: WO2010/113203
PCT Pub. Date: Oct. 7, 2010

(65) Prior Publication Data
US 2011/0289277 A1 Nov. 24, 2011

(51) Int. Cl.
*G06F 12/12* (2006.01)
(52) U.S. Cl. .................. 711/118; 711/136; 711/E12.071
(58) Field of Classification Search ........................ None
See application file for complete search history.

(56) References Cited

U.S. PATENT DOCUMENTS

| | | | |
|---|---|---|---|
| 5,452,440 A | 9/1995 | Salsburg | |
| 5,581,736 A * | 12/1996 | Smith | 711/170 |
| 5,809,523 A | 9/1998 | Kayes et al. | |
| 6,282,613 B1 | 8/2001 | Hsu et al. | |
| 6,651,153 B1 | 11/2003 | Orfali | |
| 7,139,872 B1 | 11/2006 | Bachmat | |
| 7,360,043 B1 | 4/2008 | Bonebakker | |
| 7,873,790 B2 * | 1/2011 | Bouchou et al. | 711/135 |
| 8,028,286 B2 * | 9/2011 | Fedorova | 718/102 |
| 2007/0061289 A1 | 3/2007 | Brown et al. | |
| 2008/0082769 A1 * | 4/2008 | Bouchou et al. | 711/161 |
| 2008/0134185 A1 * | 6/2008 | Fedorova | 718/102 |

FOREIGN PATENT DOCUMENTS
WO   WO 00/68796 A1   11/2000

OTHER PUBLICATIONS

Jean-Marc Kuntz, "Performance evaluation of cache architectures in tightly coupled multiprocessor systems," Future Generation Computer Systems, vol. 10, No. 1, (1994), pp. 17-27.
C. A. Prete et al., "The Charm Tool for Tuning Embedded Systems," IEEE Micro, Jul./Aug. 1997, pp. 67-76.

* cited by examiner

*Primary Examiner* — Kevin Verbrugge
(74) *Attorney, Agent, or Firm* — Foley & Lardner LLP

(57) ABSTRACT

The present invention obtains with high precision, in a storage system, the effect of additional installation or removal of cache memory, that is, the change of the cache hit rate and the performance of the storage system at that time. For achieving this, when executing normal cache control in the operational environment of the storage system, the cache hit rate when the cache memory capacity has changed is also obtained. Furthermore, with reference to the obtained cache hit rate, the peak performance of the storage system is obtained. Furthermore, with reference to the target performance, the cache memory and the number of disks and other resources that are additionally required are obtained.

13 Claims, 31 Drawing Sheets

FIG. 4

Block No

| | |
|---|---|
| 0 | DATA OF VOLUME #3 LBA 0340 |
| 1 | DATA OF VOLUME #0 LBA 6465 |
| 2 | NOT USED |
| 3 | DATA OF VOLUME #7 LBA 3542 |
| 4 | DATA OF VOLUME #15 LBA 4684 |

| 211 | 212 | 213 | 214 | 215 |
|---|---|---|---|---|
| VOLUME NUMBER | LOGICAL BLOCK ADDRESS | ACTUAL CACHE STATUS | VIRTUAL CACHE STATUS | CACHE BLOCK ADDRESS |
| 0 | 0 | CLEAN | CLEAN | 41,387 |
|  | 1 | DIRTY | DIRTY | 87,642 |
|  | ... | ... | ... | ... |
| 1 | 0 | CLEAN | CLEAN | 466,817 |
|  | 1 | NONE | CLEAN | N/A |
|  | 2 | NONE | NONE | N/A |
| ... | ... | ... | ... | ... |

FIG. 6

226 → Most Recent Used (MRU)
227 → Last Recently Used (LRU)
228 → Virtual LRU

| LRU POSITION (221) | VOLUME NUMBER (222) | LOGICAL BLOCK ADDRESS (223) |
|---|---|---|
| 0 | 0 | 12 |
| 1 | 3 | 78 |
| 2 | 2 | 68 |
| 3 | 4 | 421 |
| 4 | 1 | 546 |
| 5 | 0 | 54 |
| 6 | 2 | 29 |

Rows 0–4: Current Cache Size (224)
Rows 0–6: Target Cache Size (225)

Table number: 22

FIG. 7

| CACHE SIZE | I/O RESULT | NUMBER OF I/Os | |
|---|---|---|---|
| CURRENT | READ CACHE HIT | 65487 | 231 |
| | READ CACHE MISS | 78645 | 232 |
| | WRITE CACHE HIT | 42341 | 233 |
| | WRITE CACHE MISS | 54651 | 234 |
| TARGET | READ CACHE HIT | 87954 | 235 |
| | READ CACHE MISS | 56178 | 236 |
| | WRITE CACHE HIT | 76532 | 237 |
| | WRITE CACHE MISS | 20460 | 238 |

FIG. 8

| NOW EVALUATING | YES |
|---|---|

| | CACHE EFFECT EVALUATION RESULT | |
|---|---|---|
| | CURRENT | TARGET |
| CACHE SIZE[MB] | 16384 | 32768 |
| READ HIT[IO] | 65487 | 87954 |
| READ MISS[IO] | 78645 | 56178 |
| WRITE HIT[IO] | 42341 | 76532 |
| WRITE MISS[IO] | 54651 | 20460 |
| READ HIT RATE[%] | 45.4 | 61.0 |
| WRITE HIT RATE[%] | 43.6 | 78.9 |
| TOTAL HIT RATE[%] | 44.7 | 68.2 |

| 211 | 212 | 213 | 216 | 215 |
|---|---|---|---|---|
| VOLUME NUMBER | LOGICAL BLOCK ADDRESS | ACTUAL CACHE STATUS | LRU POSITION | CACHE BLOCK ADDRESS |
| 0 | 0 | NONE | 98755 | N/A |
| | 1 | DIRTY | 6573 | 87,642 |
| | ... | ... | ... | ... |
| 1 | 0 | CLEAN | 465 | 466,817 |
| | 1 | NONE | 78654 | N/A |
| | 2 | NONE | 6884 | N/A |
| ... | ... | ... | ... | ... |

FIG. 20

| LRU POSITION (221) | VOLUME NUMBER (222) | LOGICAL BLOCK ADDRESS |
|---|---|---|
| 0 | 0 | 12 |
| 1 | 3 | 78 |
| 2 | 2 | 68 |
| 3 | 4 | 421 |
| 4 | 1 | 546 |
| 5 | 0 | 54 |
| 6 | 2 | 29 |

225 Most Recently Used (MRU) → row 0
226 Last Recent Used (LRU) → row 3
223 Current Cache Size (rows 0–3)
228 Max Target Cache Size (rows 0–6)
22

| I/O TYPE (2310) | REFERENCED LRU POSITION (2311) | NUMBER OF I/Os (2312) |
|---|---|---|
| READ | 0-1023 | 76845 |
| | 1024-2047 | 13246 |
| | 2048-3071 | 3214 |
| | ... | ... |
| WRITE | 0-1023 | 87653 |
| | 1024-2047 | 34234 |
| | 2048-3071 | 10364 |
| | ... | |

FIG. 28

| CACHE EFFECT EVALUATION RESULT | | | | |
|---|---|---|---|---|
| CACHE SIZE[MB] | 8192 | 16384 | 32768 | 65536 |
| READ HIT[IO] | 34231 | 65487 | 87954 | 90987 |
| READ MISS[IO] | 109901 | 78645 | 56178 | 53145 |
| WRITE HIT[IO] | 13546 | 42341 | 76532 | 78358 |
| WRITE MISS[IO] | 83446 | 54651 | 20460 | 18634 |
| READ HIT RATE[%] | 23.7 | 45.4 | 61.0 | 63.1 |
| WRITE HIT RATE[%] | 13.9 | 43.6 | 78.9 | 80.8 |
| TOTAL HIT RATE[%] | 19.8 | 44.7 | 68.2 | 70.2 |

OK

| | CURRENT | TARGET | |
|---|---|---|---|
| NUMBER OF PROCESSORS | 32 | 64 | 531 |
| NUMBER OF DISKS TYPE A | 64 | 128 | 532 |
| NUMBER OF DISKS TYPE B | 64 | 64 | 533 |
| ... | ... | ... | |

| MAXIMUM I/O PER DISK TYPE A IN A SECOND | 200 |
|---|---|
| MAXIMUM I/O PER DISK TYPE B IN A SECOND | 150 |

| READ HIT[μs] | 10 | ~551 |
|---|---|---|
| READ MISS[μs] | 30 | ~552 |
| WRITE HIT[μs] | 20 | ~553 |
| WRITE MISS[μs] | 40 | ~554 |

FIG. 36

|  | CURRENT | TARGET |
|---|---|---|
| STORAGE PERFORMANCE ESTIMATION | | |
| CACHE SIZE[MB] | 16384 | 32768 |
| DISKS TYPE A[UNITS] | 64 | 64 |
| DISKS TYPE B[UNITS] | 64 | 128 |
| CONTROL PROCESSORS[UNITS] | 32 | 64 |

START  CANCEL

FIG. 37

| | PERFORMANCE ESTIMATION RESULT | |
|---|---|---|
| | CURRENT | TARGET |
| CACHE SIZE[MB] | 16384 | 32768 |
| DISKS[UNITS] | 128 | 192 |
| CONTROL PROCESSORS[UNITS] | 32 | 64 |
| PEAK PERFORMANCE LIMITED BY DISKS[IOPS] | 51345 | 84719 |
| PEAK PERFORMANCE LIMITED BY PROCESSORS[IOPS] | 40865 | 98076 |
| PEAK PERFORMANCE[IOPS] | 40865 | 84719 |

| PROCESSOR[$/UNIT] | 10,000 | ~571 |
|---|---|---|
| DISK TYPE A[$/UNIT] | 1,000 | ~572 |
| DISK TYPE B[$/UNIT] | 600 | ~573 |
| CACHE MEMORY [$/GB] | 3,000 | ~574 |

| REQUIRED RESOURCES | | | | ADD ON AMOUNT | | | | EXTRA COST [$] |
|---|---|---|---|---|---|---|---|---|
| CACHE SIZE [MB] | PROCE SSORS [UNITS] | DISKS TYPE A [UNITS] | DISKS TYPE B [UNITS] | CACHE SIZE [MB] | PROCE SSORS [UNITS] | DISKS TYPE A [UNITS] | DISKS TYPE B [UNITS] | |
| 16384 | 64 | 448 | 64 | 0 | 32 | 384 | 0 | 320,000 |
| 32768 | 48 | 354 | 64 | 16,384 | 16 | 290 | 0 | 208,000 |
| 49152 | 34 | 273 | 64 | 32,768 | 2 | 209 | 0 | 116,000 |
| 65536 | 32 | 261 | 64 | 49,152 | -1 | 197 | 0 | 134,000 |
| ... | ... | ... | ... | ... | ... | ... | ... | ... |

Column labels: 581, 582, 583, 584, 585, 586, 587, 588, 589

FIG. 44

```
┌─────────────────────────────────┐
│   STORAGE CONFIGURATION         │
│        PROPOSITION              │
│                                 │
│   TARGET                        │
│   PERFORMANCE     [ 80000 ]     │
│     [IOPS]                      │
│                                 │
│   ADDITIONAL                    │
│   DISK TYPE       [ TYPE A ]    │
│                                 │
│     ( START )     ( CANCEL )    │
└─────────────────────────────────┘
```

FIG. 45

| CONFIGURATION CANDIDATES LIST | | | | |
|---|---|---|---|---|
| CACHE SIZE[MB] | 16384(+0) | 32768(+16384) | 49152(+32768) | 65536(+49152) |
| PROCESSORS[UNITS] | 64(+32) | 48(+16) | 34(+2) | 32(+0) |
| DISKS TYPE A[UNITS] | 448(+384) | 354(+290) | 273(+209) | 261(+197) |
| DISKS TYPE B[UNITS] | 64(+0) | 64(+0) | 64(+0) | 64(+0) |
| ADDITIONAL COSTS[$] | 704,000 | 498,000 | 325,000 | 331,000 |

LOWEST ( OK )

INFORMATION PROCESSING SYSTEM FOR MEASURING THE CACHE EFFECT IN A VIRTUAL CAPACITY

TECHNICAL FIELD

This invention relates to the information processing in a storage system which has multiple disk drives for storing data.

BACKGROUND ART

What is called a storage system which stores data in a disk array including multiple magnetic disk drives is well known.

The storage system comprises disk arrays for storing data and a controller unit for controlling disk drives. The controller unit includes host interface units, disk interface units, cache memory, processors, and switch units connecting them. The storage system is connected to host computers via host interfaces and to disk arrays via disk interfaces.

In a storage system, host interfaces are used for connection to host computers. Furthermore, disk interfaces are used for connection to disk arrays. Cache memory is used for accelerating access from hosts to the storage system and for storing part of data in a disk array. Furthermore, switches are used for connecting the components in the storage system. Processors are used for controlling those components in the storage system.

In cache memory, data that has been accessed recently by the host computers is stored. If the cache memory capacity becomes insufficient, the least recently accessed data in the cache memory is replaced by recently accessed data. For this cache control, the LRU (Least Recently Used) algorithm is used frequently.

For such a storage system, normally, even after the start of the operation, additional resources can be installed if necessary. For example, if the capacity or the disk performance is insufficient, the problem can be solved by installing additional disk drives. Furthermore, if the control processor performance is insufficient, additional processors can be installed. Similarly, if the cache memory capacity is insufficient and the performance cannot be fully provided, additional cache memory can be installed.

As mentioned above, there are various methods for improving the storage system performance, though the effect of installing additional cache memory significantly varies depending on each operation of the storage system. For example, the following cases can be considered.

A case is suggested where 16 gigabytes of cache memory is installed in the storage system, the host computer accesses a range of 20 gigabytes sequentially from the head block, and after accessing the last block, returns to the head block and repeats access. In this case, as the cache memory has only 16 gigabytes of the latest data, the access from the host computer does not hit the cache memory. Meanwhile, when additional cache memory is installed to be 20 gigabytes from 16 gigabytes, the data to be accessed by the host stays in the cache memory and all the access becomes cache hits. For example, if additional cache memory is installed to be 32 gigabytes from 16 gigabytes, the cache hit rate changes from 0% to 100%.

Furthermore, as another example, a case is suggested where 16 gigabytes of cache memory is installed in the storage system, and the host computer accesses a range of 64 gigabytes randomly without any regularity. In this case, the probability of the accessed data existing in the cache memory amounts, with reference to the capacity ratio, to (16 GB/64 GB)=25%. At this time, if the cache memory is 32 gigabytes, similarly with reference to the capacity ratio, the cache hit rate amounts to (32 GB/64 GB)=50%. That is, if additional cache memory is installed, 32 gigabytes from 16 gigabytes in this example, the cache hit rate changes from 25% to 50%.

As is evident from the above-mentioned two examples, the effect of installing additional cache memory depends on the access patterns of the host computer. As a result, the determination on how much additional cache memory to install must be with reference to the estimation reflecting the access patterns of the host computer.

As for this point, for example, the Patent Document 1 discloses a mathematical method of estimating the cache hit rate with reference to the access patterns issued by the host computer and the cache memory capacity.

Patent Citation 1: U.S. Pat. No. 7,139,872B1

DISCLOSURE OF INVENTION

Technical Problem

However, the method of estimation described in Patent Documentation 1 includes many assumptions (prior conditions) and approximations for the estimation, such as that the access interval from the host computer must be equal and that the whole data in the storage system comprises multiple files, each of which must occupy the equal amount of cache memory. As a result, errors are caused by modeling, and the high-precision estimation cannot be achieved.

Furthermore, in a storage system which has various methods of additional installation for the performance such as cache memory, processors, disk drives etc., it is impossible to determine with this method which resources and how much of them to install additionally.

This invention is intended, in view of this situation, for obtaining the effect of additional installation or removal in a storage system with high-precision, that is, the change of the cache hit rate or the storage system performance at that time, while interfacing with the use status of the storage system.

Technical Solution

For solving the above-mentioned problems, the information processing system (100) of this invention obtains the cache effect (hit rate) by counting the I/O frequency (such as the number of cache hits and cache misses) in actual operations, that is, when adopting cache memory of the virtual capacity while processing actual I/O requests (read I/O and write I/O).

As more specifically described, the information processing system (100) of this invention comprises a storage system including a storage control program (3), processors (78), disk drives (9), cache memory (73), and an LRU list (22) to manage the reference status to the data in the cache memory (73), and a management computer (4) which transmits a request to the storage system (1) for measuring the cache effect in a virtual capacity which is different from the actual capacity of cache memory (73) and includes a storage management program (5). In the storage system (1), the storage control program (3), in response to the measurement request, creates the first cache effect information regarding the I/O processing frequency by counting the I/O processing frequency in response to the I/O request when the cache memory (73) has the virtual capacity, with reference to the information of the LRU list (22), and transmits the relevant first cache effect information to the management computer (4). Meanwhile, the storage management program (5) in the management computer (4) outputs the first cache effect information, and notifies the user of the effect of additional installation or removal of cache.

Furthermore, the storage system (1) includes a cache directory table (21), which has been created with reference to the LRU list (22), for managing the status of the data stored in the disk drives (9) in the cache memory (73). In this case, the storage control program (3) executes the determination of I/O processing frequency (such as the number of cache hits and cache misses for the I/O request) by referring to the cache directory table (21).

Furthermore, the storage control program (3), in response to the measurement request, counts the number of cache hits and cache misses for the I/O request with reference to the LRU list (22), and creates the second cache effect information for the number of cache hits and cache misses when the cache memory (73) has an actual capacity. The first and the second cache effect information are compared and output by the management computer (4).

Note that it is preferable that cache effect information is created in the actual operational environment of the storage system (1).

Furthermore, the management computer (4) includes performance tables (54 and 55) that manage each performance of the processors (78) and the disk drives (9) in the storage system (1). The storage management program (5) in the management computer (4), by the first and the second cache effect information and the information on each performance of the processors (78) and the disk drives (9), calculates the peak performance of the processors (78) and each of the disk drives (9), and with reference to them, calculates and outputs the peak performance of the storage system (1) (peak performance in the current configuration and the virtual configuration of the storage system (1)).

The management computer (4) further includes a component cost table (57) that manages the cost information of cache memory (73), processors (78), and each of the disk drives (9). The storage management program (5) in the management computer (4), receiving the input of the information on the target performance of the storage system (1), and obtains the target storage configuration information including the information on the capacity of the cache memory (73), the number of disk drives (9), and the number of processors (78), with reference to the first cache effect information corresponding to the capacity of the cache memory (73). Furthermore, the storage management program (5) refers to the component cost table (57), calculates the increase and decrease of the cost required for achieving the target performance compared with the storage configuration information, and outputs the calculated increase and decrease of the cost. Note that, as for the cost calculation, it is advised to obtain the multiple pieces of target storage configuration information required for achieving the target performance corresponding with the multiple candidates of the cache memory (73) and to calculate the increase and decrease of the cost corresponding with the multiple pieces of target storage configuration information. These multiple pieces of cost information are output in contrast with each other. It is also preferable, for achieving the target performance, to output the target storage configuration whose total cost amounts to the smallest, distinguished from the other target storage configuration.

Further characteristics of this invention are disclosed below, by the Best Mode(s) for Carrying Out the Invention and the attached figures.

Advantageous Effects

This invention enables the storage system to obtain the high-precision calculation of the change of the cache hit rate when the capacity of cache memory is additionally installed or removed, with reference to the actual access during the operation.

Furthermore, the peak performance of the storage system when changing the amount of resources in the storage system including the cache memory can be obtained.

It is also possible to suggest the most appropriate method of additional installation or removal for keeping the cost low when the target peak performance is provided.

BRIEF DESCRIPTION OF THE DRAWINGS

FIG. 4 is a diagram showing an example of data stored in a cache memory unit 73 in the first embodiment.

FIG. 5 is a diagram showing an example of a cache directory table 21 in the first embodiment.

FIG. 6 is a diagram showing an example of an LRU list 22 in the first embodiment.

FIG. 7 is a diagram showing an example of an I/O counter table 23 in the first embodiment.

FIG. 8 is a diagram showing an example of the system status 25 in the first embodiment.

FIG. 18 is a diagram showing an example of the screen displayed by the evaluation result display function 52 in the first embodiment.

FIG. 19 is a diagram showing an example of a cache directory table 21 in the second embodiment.

FIG. 20 is a diagram showing an example of the LRU list 22 in the second embodiment.

FIG. 21 is a diagram showing an example of the I/O counter table 23 in the second embodiment.

FIG. 28 is a diagram showing an example of the screen displayed by the evaluation result display function 52 in the second embodiment.

FIG. 31 is a diagram showing an example of the disk performance table 54 in the third embodiment.

FIG. 32 is a diagram showing an example of the processor performance table 55 in the third embodiment.

FIG. 36 is a diagram showing an example of the screen displayed by the evaluation parameter input function 51 in the third embodiment.

FIG. 37 is a diagram showing an example of the screen displayed by the evaluation result display function 52 in the third embodiment.

FIG. 39 is a diagram showing an example of the component cost table 57 in the fourth embodiment.

FIG. 40 is a diagram showing an example of the configuration candidate table 58 in the fourth embodiment.

FIG. 44 is a diagram showing an example of the screen displayed by the evaluation parameter input function 51 in the fourth embodiment.

FIG. 45 is a diagram showing an example of the screen displayed by the evaluation result display function 52 in the fourth embodiment.

EXPLANATION OF REFERENCE

Figure 1:
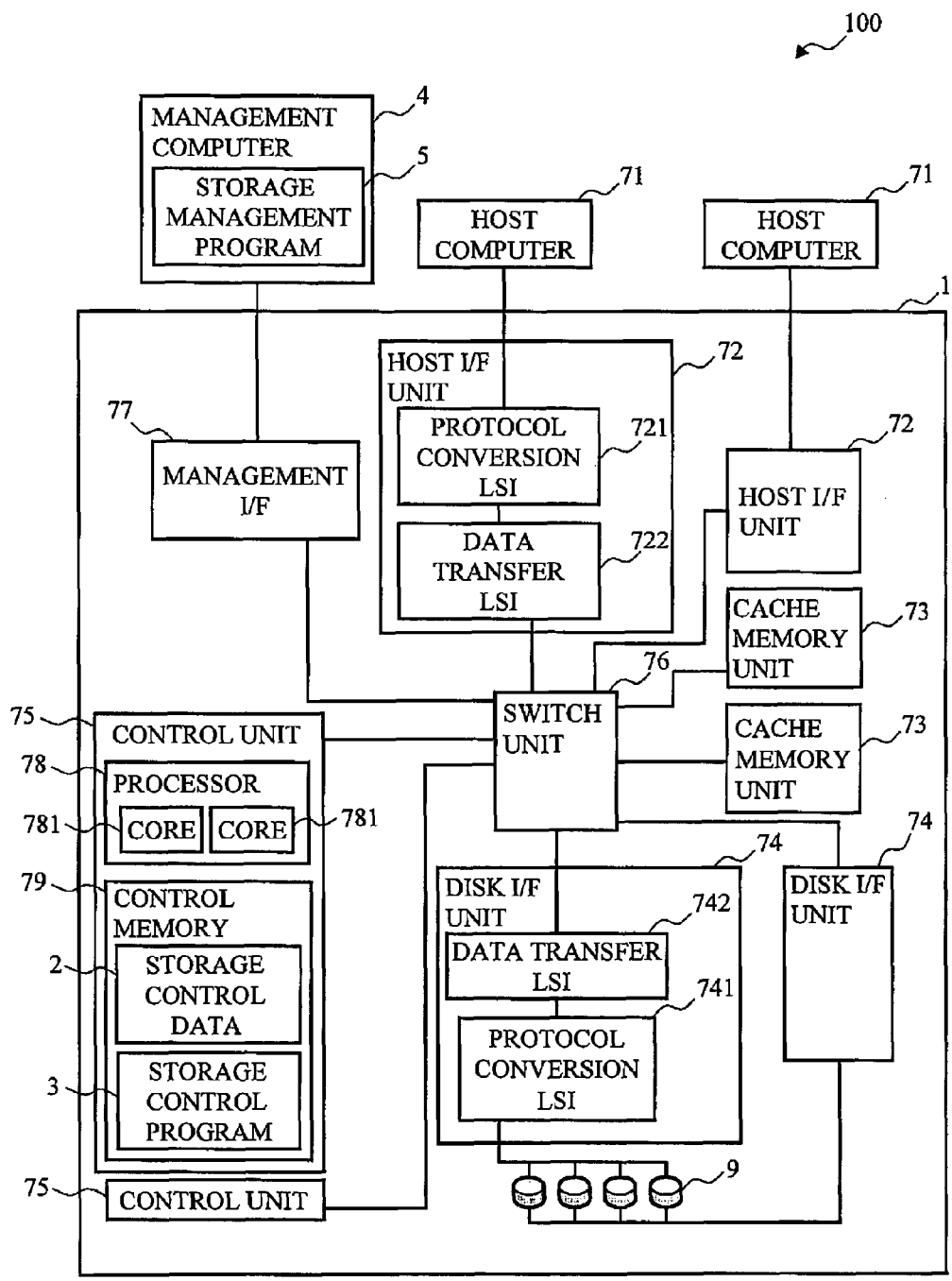
FIG. 1 is a diagram showing the configuration overview of an information processing system 100 which is common to the embodiments of this invention.

1 Storage system
2 Storage control data
3 Storage control program
4 Management computer
5 Storage management program
9 Disk drive
21 Cache directory table
22 LRU list
54 Disk performance table
55 Processor performance table
57 Component cost table
73 Cache memory unit
75 Control unit
78 Processor
100 Information processing system

BEST MODE FOR CARRYING OUT THE INVENTION

This invention relates to the technology for achieving suggested methods for performance estimation and additional installation of a storage system.

The embodiments of this invention are described below with reference to the attached figures. However, it is addressed that these embodiments are merely examples for implementation the present invention, and do not limit the technical scope of the claims. Furthermore, for the common configuration in the figures, the common reference numerals are given.

First Embodiment

The first embodiment is an example where, in the information processing system configured of a storage system 1 and a management computer 4, if the cache memory capacity is specified by an administrator, the storage system 1 obtains the cache hit rate of that time and reports it to the administrator. In this case, the storage system 1 processes regular requests from a host computer 71 while it calculates the change in the case of the capacity of the specified cache, and obtains the effect of additional installation or removal of cache memory 73. Such a specified cache capacity is hereinafter referred to as a target capacity.

System Configuration

FIG. 1 is a diagram showing the configuration overview of an information processing system 100. The information processing system 100 includes a storage system 1, a management computer 4, and at least one host computer 71.

The storage system 1 includes disk drives 9, host interface units 72 for communicating with the host computer(s) 71, disk interface units 74 for exchanging data with the disk drives 9, cache memory units 73 that store the data for rapidly accessing part of the data stored in the disk drives 9, a control unit 75 that includes a control memory 79 and controls the storage system 1, an interface for the management computer 77 that exchange information with the management computer 4, and a switch LSI 76 that connects those components.

The configuration of a host interface unit 72 is as follows. The host interface unit 72 comprises a protocol conversion LSI 721 that converts the protocols such as Fibre Channel for connection to the host computer 71 and the protocols such as PCI for the use in the storage and a data transfer LSI 722 that follows the commands from the control unit 75 and transfers data between the protocol conversion LSI 721 and the cache memory units 73.

The configuration of a disk interface unit 74 is as follows. The disk interface 74 comprises a protocol conversion LSI 741 that converts the protocols such as Fibre Channel or SAS (Serial Attached SCSI) for connection to the hard disk 6 and the protocols for the use in the storage and a data transfer LSI 742 that follows the commands from the control unit 75 and transfers data between the hard disk 6 and the cache memory units 73.

The configuration of a control unit 75 is as follows. The control unit 75 comprises a processor 78 and a control memory 79. The processor 78 can include multiple processor cores 781. The processor 78 operates the storage control program 3 that controls the storage system 1, and executes control such as data transfer in the storage system 1. In the control memory 79, the above-mentioned storage control program 3 and the storage control data 2 are stored.

The configuration of the management computer 4 is as follows. In the management computer 4, the storage management program 5 that manages the storage system 1 is stored, and this program enables the management of the storage system 1.

Various Data and Programs in a Storage System

Figure 2:
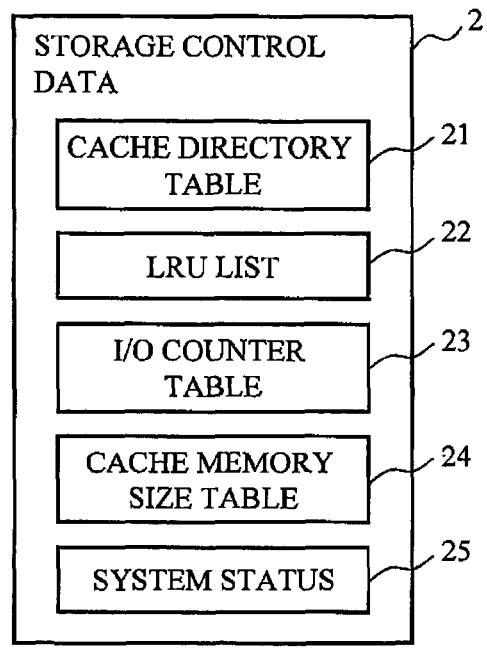
FIG. 2 is a diagram showing the configuration of storage control data 2 stored in a control memory 79 in a control unit 75 in the first embodiment.

FIG. 2 is a diagram showing the configuration of storage control data 2 stored in the control memory 79 in the control unit 75. The control data 2 includes, as information, a cache directory table 21, an LRU list 22, an I/O counter table 23, a cache memory size table 24 and the system status 25.

Figure 3:
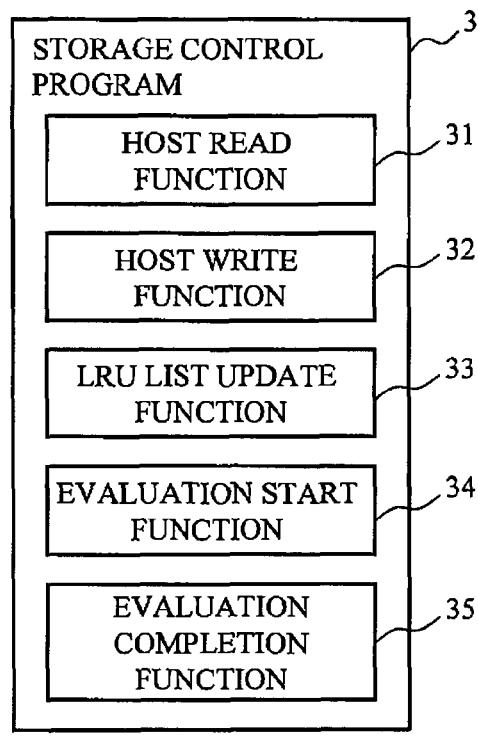
FIG. 3 is a diagram showing the functions included in a storage control program 3 in the first embodiment.

FIG. 3 is a diagram showing the functions included in the storage control program 3. The storage control program 3 comprises the host read function 31, the host write function 32, the LRU list update function 33, the evaluation start function 34 and the evaluation completion function 35. These functions operate as the processing units in collaboration with the control unit 75. That is, the host read function operates as the host read processing unit, the host write function operates as the host write processing unit, the LRU list update function operates as the LRU list update processing unit, the evaluation start function operates as the evaluation start processing unit, and the evaluation completion function operates as the evaluation completion processing unit.

FIG. 4 is a diagram showing an example of data stored in a cache memory unit 73. The storage area of the cache memory unit 73 is divided into multiple areas in units of blocks, and in each block, the data corresponding to any of the areas in the disk. In this example, the LBA (Logical Block Address) 340 of the volume 3 is stored in the block 0. Meanwhile, for example, the block 2 shows that it is not used currently. The block size is a fixed value approximately from 512 bytes to 1 megabyte. For example, if the cache memory size is 16 gigabytes and the block size is 4 kilobytes, it shows that there are 4M units of cache blocks.

FIG. 5 is a diagram showing an example of a cache directory table 21. This table is used for determining whether the data stored in a disk of the storage system exists in the cache memory, and if it does, for managing the storage area. It is also referred to for determining where in the cache memory the target data is, in response to an I/O request from the host computer 71. Furthermore, when allocating a block in the cache memory to specific data, or when releasing blocks in the cache memory, the table 21 is modified.

In the cache directory table 21, the volume number 211 is a unique identifier for distinguishing multiple volumes existing in the storage system 1. The logical block address (LBA) 212 shows the block address of each volume. The actual cache status 213 is the information showing whether the data corresponding with the volume number 211 and the LBA 212 exists in the current storage system 1.

In FIG. 5, CLEAN shows that the corresponding data exists in the cache memory, and at the same time, the relevant data matches the data in the disk and will not be written back to the disk. Meanwhile, DIRTY shows that the corresponding data exists in the cache memory, and at the same time, the relevant data is newer than the data in the disk and must be written back to the disk. Furthermore, NONE shows that the corresponding data does not exist in the cache memory.

The virtual cache status 214 shows the cache memory status when the cache memory capacity is the target capacity. The items show the same information as the corresponding items in the actual cache status 213. The virtual cache status 214 is blank before the target capacity is specified, and the cache memory status when the cache memory capacity is the target capacity can be checked by processing the access to the cache for a specific length of time, after the target capacity is specified by the user and before counting the number of actual I/Os. Furthermore, as another method, the status when the cache memory capacity is the target capacity can be checked with reference to the LRU list in FIG. 6 without processing actual access.

The cache block address 215 shows where in the cache memory the data of the volume number 211 and the LBA 212 exists.

FIG. 6 is a diagram showing an example of an LRU list 22. This table is used for ascertaining which data in cache memory is frequently referenced to and which data is not frequently referenced to. The table is referred to for determining the data to be replaced when the cache memory capacity is insufficient, and it is updated when the cache memory is referenced to.

The LRU position 221 shows the position of each entry in this LRU list 22. Zero "0" shows that it is the most recently accessed (Most Recently Used) data. Furthermore, as the number becomes larger, it shows that the time has passed longer since the last access. The volume number 222 and the logical block address (LBA) 223, as well as the cache directory table 21, are unique identifiers for the data in the storage system 1.

Hereinafter, the head block of this list is called the MRU (Most Recently Used) 226. Meanwhile, the position corresponding with the current cache memory capacity 224 is called the LRU (Least Recently Used) 227. This data is the target of replacement from the cache memory. Furthermore, the position corresponding with the target capacity 225 is called the virtual LRU 228.

In regular storage systems, the number of entries in an LRU list table can be calculated by dividing the actual cache capacity by the block size, though in this embodiment, it is supposed to be the number of entries corresponding with the larger of the actual cache capacity and the target capacity, and even if the target capacity is larger than the actual cache capacity, cache processing can be executed.

FIG. 7 is a diagram showing an example of an I/O counter table 23. This table is for recording, classified by I/O types, for both cases where the cache memory capacity is the actual cache capacity and the target capacity, whether each I/O request access from the host computer 71 is a cache hit. The table is updated each time I/O from the host computer 71 is processed. Furthermore, the table is referred to when transmitting the contents of this counter to the management computer 4.

231 shows the frequency of read I/O from the host being cache hits in the actual cache capacity. 232 shows the number of read I/Os from the host being cache misses in the actual cache capacity. 233 shows the number of write I/Os from the host being cache hits in the actual cache capacity. 234 shows the number of write I/Os from the host being cache misses in the actual cache capacity. Fields from 235 to 238 are the same as those from 231 to 234 except that the cache memory capacity is not the actual capacity but the target capacity.

In FIG. 7, as for the cache in the actual capacity, the number of I/Os being cache hits/misses is always counted. Meanwhile, before the target capacity is set, the number of I/Os being cache hits/misses for the cache in the target capacity is blank. When the target capacity is set, the cache in the actual capacity is reset, the numbers of cache I/Os from the host being cache hits/misses in the actual capacity and in the target capacity are counted, and the table is filled in with the values.

FIG. 8 is a diagram showing an example of the system status 25. It shows whether the storage system 1 is currently evaluating the effect of the change in the cache capacity.

Processing Details of the Host Read Function

Figure 9:
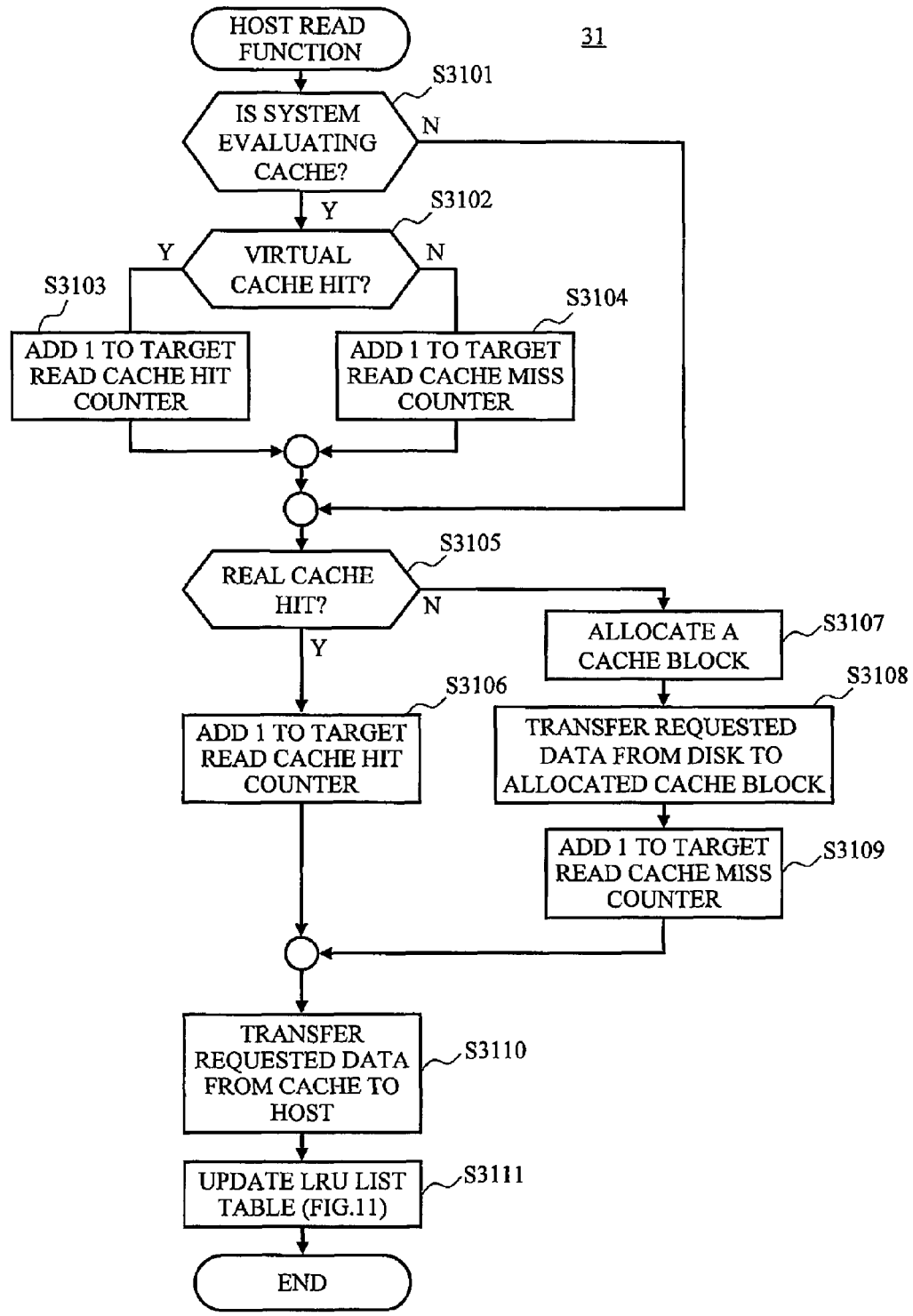
FIG. 9 is a flowchart (example) showing the processing details of a host read function 31 in the first embodiment.

FIG. 9 is a flowchart (example) showing the processing details of the host read function 31. The host read function 31, in response to a read I/O request from the host computer 71, determines whether the requested data exists in the cache memory, and if it does not, reads the relevant data from the disk to the cache memory, and transmits the data to the host computer 71. At the same time, whether it is a cache hit is reflected in the I/O counter table 23. The processing by the host read function 31 is sequentially described below.

By this function, firstly, the host read processing unit 31 determines whether the storage system is currently evaluating the cache in the target capacity (S3101). Specifically, it refers to the system status 25 (FIG. 8) and determines whether the evaluation is in process. If not, as cache processing in the target capacity is not required, the processing proceeds to S3105.

If the evaluation is in process, the host read processing unit 31 determines whether it is a cache hit in the target capacity (S3102). Specifically, it refers to the cache directory table 21 for the virtual cache status 214 of the entry corresponding with the volume and the LBA requested by the host. If the status is CLEAN or DIRTY, it means a cache hit, and the host read processing unit 31 adds 1 to the read cache hit counter in the target capacity 235 in the I/O counter table 23 (S3103). The processing proceeds to S3105.

Meanwhile, if the status is NONE in S3102, it means a cache miss, and the host read processing unit 31 adds 1 to the read cache miss counter in the target capacity 236 in the I/O counter table 23 (S3104). The processing proceeds to S3105.

Next, the host read processing unit 31 determines whether data exists in the actual cache memory (S3105). Specifically, as in S3102, the host read processing unit 31 refers to the actual cache status 213 of the cache directory table 21. If the status is CLEAN or DIRTY, the requested data is in the cache, and the host read processing unit 31 adds 1 to the read cache hit counter in the actual capacity 231 in the I/O counter table 23 (S3103), and the processing proceeds to S3110. Meanwhile, if the status is NONE in S3105, the requested data is not in the cache. Therefore, the host read processing unit 31 firstly allocates one block in the cache memory unit (S3107). Then, the host read processing unit 31 transfers the data requested by the host computer 71 from a disk 9 to the block in the cache memory allocated in the previous step (S3108). Furthermore, the host read processing unit 31 adds 1 to the read cache miss counter in the actual capacity 232 in the I/O counter table 23. The processing proceeds to S3110.

Next, the host read processing unit 31 transmits the data requested by the host computer 71 from the cache memory to the host computer 71 (S3110). Finally, the host read processing unit 31 updates the LRU list table 22 (S3111). The method of updating the LRU list table 22 is described later.

Processing Details of the Host Write Function

Figure 10:
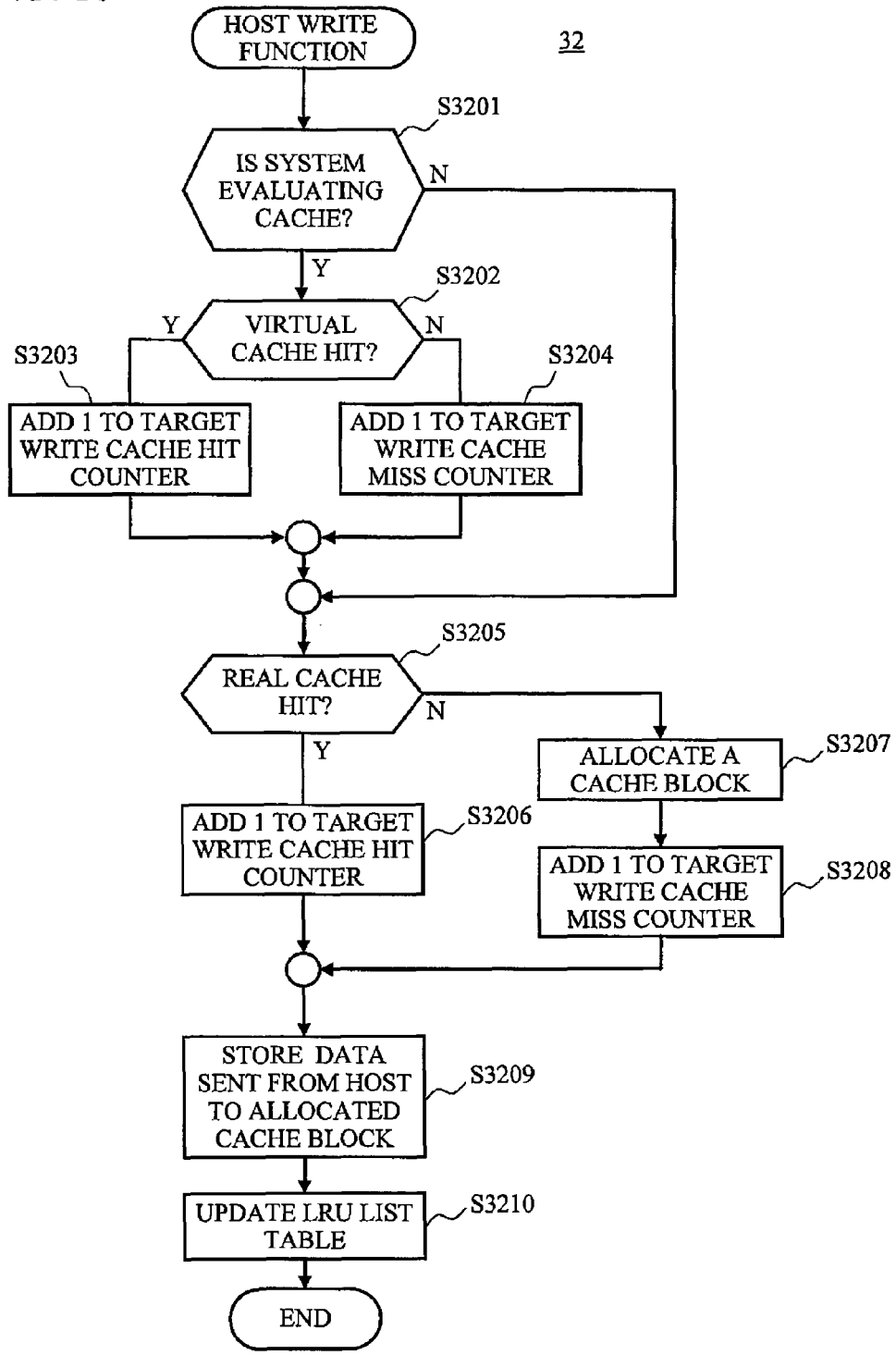
FIG. 10 is a flowchart (example) showing the processing details of a host write function 32 in the first embodiment.

FIG. 10 is a flowchart (example) showing the processing details of the host write function 32. The host read function 32, in response to a write I/O request from the host computer 71, stores the transmitted data in the cache memory. At the same time, whether it has already been allocated by the cache memory (it is a cache hit) is reflected in the I/O counter table 23. The processing by the host write processing unit 32 is sequentially described below.

By this function, firstly, the host write processing unit 32 determines whether the storage system is currently evaluating the cache in the target capacity (S3201). Specifically, it refers to the system status 25 and determines whether the evaluation is in process. If not, as cache processing in the target capacity is not required, and the processing proceeds to S3205. If the evaluation is in process, the host write processing unit 32 determines whether it is a cache hit in the target capacity (S3202). Specifically, it refers to the cache directory table 21 for the virtual cache status 214 of the entry corresponding with the volume and the LBA requested by the host. If the status is DIRTY, the cache area has already been allocated, and the host write processing unit 32 adds 1 to the write cache hit counter in the target capacity 237 in the I/O counter table 23 (S3203). The processing proceeds to S3205.

Meanwhile, if the status is CLEAN or NONE in S3202, it means a cache miss, and the host write processing unit 32 adds 1 to the write cache miss counter in the target capacity 238 in the I/O counter table 23 (S3204). The processing proceeds to S3205.

Next, the host write processing unit 32 determines whether data exists in the actual cache memory (S3205). Specifically, as in S3202, it refers to the actual cache status 213 of the cache directory table 21. If the status is DIRTY, a cache area has already been allocated for host write, and the host write processing unit 32 adds 1 to the write cache hit counter in the actual capacity 233 in the I/O counter table 23, and the processing proceeds to S3209. Meanwhile, if the status is CLEAN or NONE in S3205, the requested data is not in the cache memory. Therefore, the host write processing unit 32 firstly allocates one block in the cache memory unit (S3207). Specifically, if the status is CLEAN, the actual cache status 213 of the cache directory table 21 is rewritten from CLEAN to DIRTY for making the block into a write area. If the status is NONE, the host write processing unit 32 selects one free cache memory block, writes its block address in the cache block address 214 of the cache directory while switching the actual cache status 213 to DIRTY (S3207). Then, the host write processing unit 32 adds 1 to the write cache miss counter in the actual capacity 234 in the I/O counter table 23, and the processing proceeds to S3210.

Next, the host write processing unit 32 transfers the data requested by the host computer 71 to the corresponding block in the cache memory (S3209). Finally, the host write processing unit 32 updates the LRU list table 22 (S3210). The method of updating the LRU list table 22 is described later.

Processing Details of the LRU List Update Function

Figure 11:
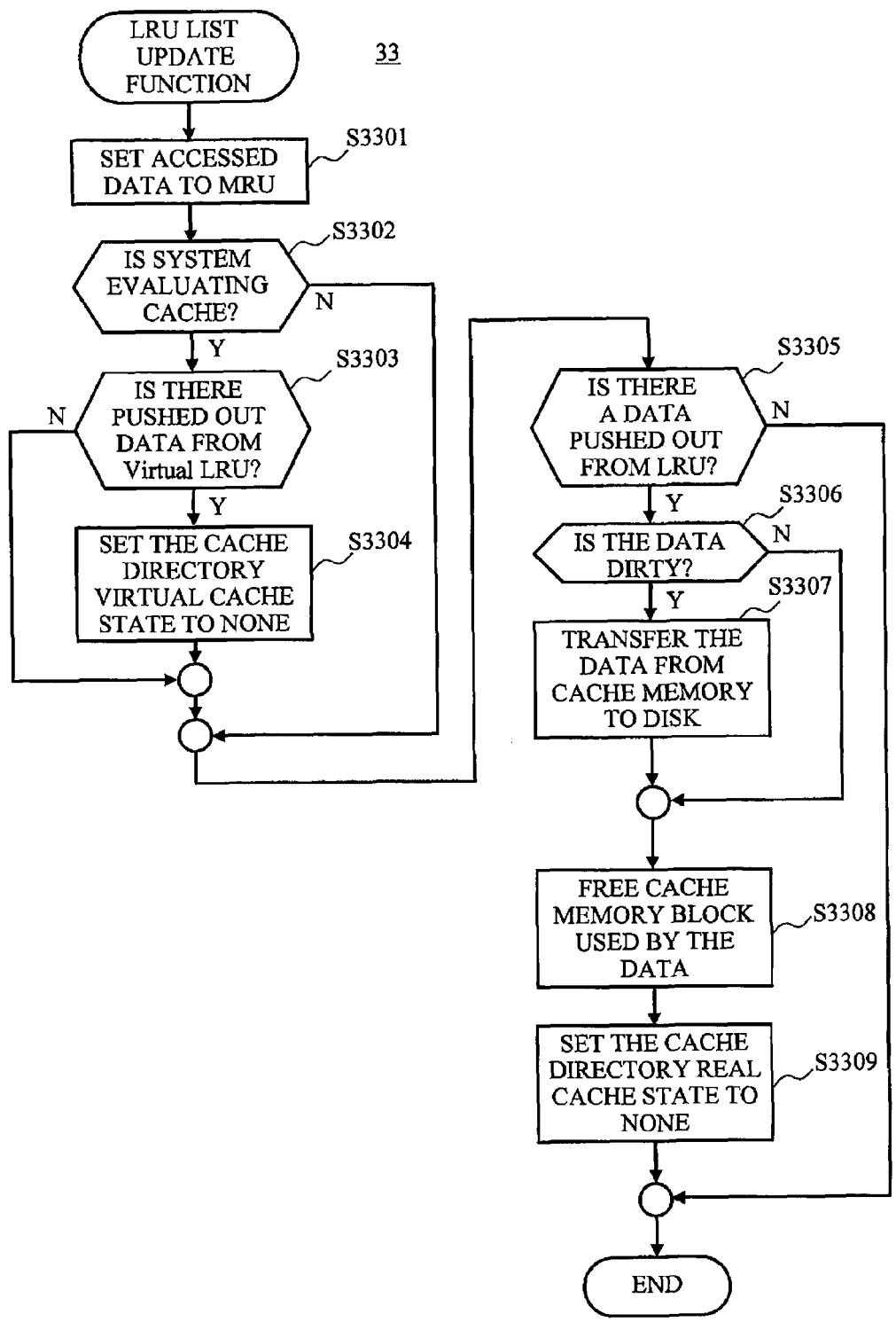
FIG. 11 is a flowchart (example) showing the processing details of an LRU list update function 33 in the first embodiment.

FIG. 11 is a flowchart (example) showing the processing details of the LRU list update function 33. This function enables updating the LRU list and making free space in the cache memory when accepting access to the cache memory, and is invoked by the host read function 31 and the host write function 32. The processing detail of the LRU list update function 33 is sequentially described below.

By this function, the LRU list update processing unit 33 firstly sets the accessed data in the MRU (S3301). Specifically, if the data has not been included in the LRU list, each of the other entries that have originally been included in the LRU list is shifted, and the volume number and the LBA of the accessed data are recorded in the position of the MRU. Meanwhile, if the accessed data has originally been included in the LRU list, it is moved to the position of the MRU, and the data that has originally been closer to the MRU than the accessed data is shifted.

Next, the LRU list update processing unit 33 determines whether the cache in the target capacity is currently evaluated (S3302). Specifically, it refers to the system status 25 and determines whether the evaluation is in process. If not, no processing for the virtual LRU is required, and the processing proceeds to S3305. If the evaluation is in process, the LRU list update processing unit 33 checks whether there is any data pushed out from the virtual LRU, that is, whether there is any data that was in the position of the virtual LRU and then shifted (S3303). Only if such data exists, for the entry of the cache directory table 21 corresponding with the pushed out data, the virtual cache status 214 is set to NONE.

Similarly, the LRU list update processing unit 33 checks whether there is any data pushed out from the LRU (S3305). If not, the processing is complete. If such data exists, the LRU list update processing unit 33 determines whether the pushed out data is DIRTY, that is, whether the data in the cache memory is newer than the data in the disk (S3306). Specifically, as for the corresponding entry in the cache directory 21, the actual cache status 213 is referred to for determining whether it is DIRTY or not.

If the data is determined to be DIRTY in S3306, as the latest data in the cache memory must be written back to the disk, the LRU list update processing unit 33 transfers the relevant data from the cache memory to the disk (S3307). If the data is determined not to be DIRTY in S3306, the processing proceeds to S3308.

Next, the LRU list update processing unit 33 releases the block that has been occupied by the data in the cache memory (S3308). Finally, for the corresponding entry of the cache directory table 21, the LRU list update processing unit 33 sets the actual cache status 213 to NONE.

Figure 12:
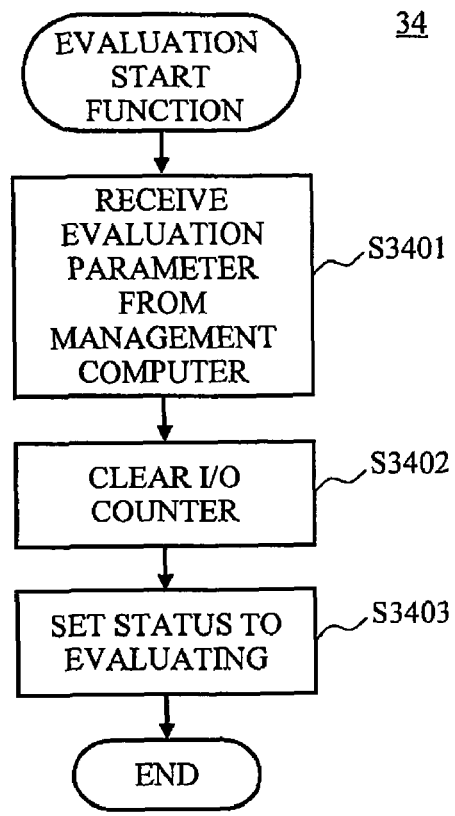
FIG. 12 is a flowchart (example) showing the processing details of an evaluation start function 34 in the first embodiment.

Processing Details of the Evaluation Start Function and the Evaluation Complete Function FIG. 12 is a flowchart (example) showing the processing details of the evaluation start function 34. This function, following the commands from the management computer 4, executes the preprocessing for estimating the cache effect when the cache memory capacity has been changed. The processing of the evaluation start function 34 is sequentially described below.

By this function, firstly, the evaluation start processing unit 34 receives the evaluation parameter from the management computer 4 (S3401). Specifically, it shows the target capacity of the cache memory and other information.

Next, the evaluation start processing unit 34 initializes the value of the I/O counter table 23 to 0 (S3402). Finally, the evaluation start function 34 sets the system status 25 during the evaluation (S3403), and completes the processing.

Figure 13:
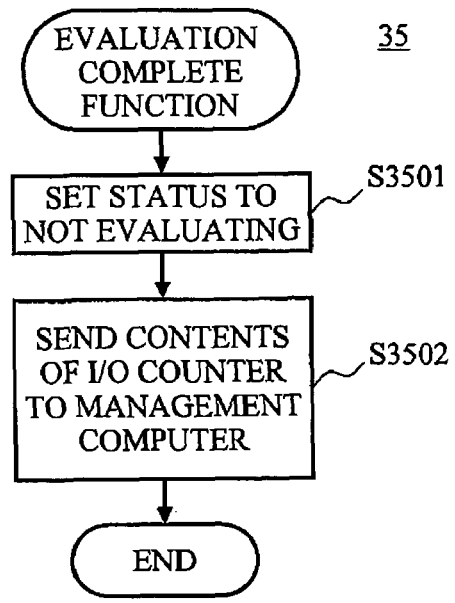
FIG. 13 is a flowchart (example) showing the processing details of an evaluation complete function 35 in the first embodiment.

FIG. 13 is a flowchart (example) showing the processing details of the evaluation complete function 35. This is the function for completing the above-mentioned evaluation following the command from the management computer 4 or due to the passage of a certain length of time. The processing of the evaluation complete function 35 is sequentially described below.

By this function, firstly, the evaluation complete processing unit 35 sets the system status 25 during the normal operation (S3501). Then the evaluation complete processing unit 35 transmits the contents of the I/O counter table 23 to the management computer 4 (S3502) and completes the processing.

Various Data and Programs in a Management Computer

Figure 14:
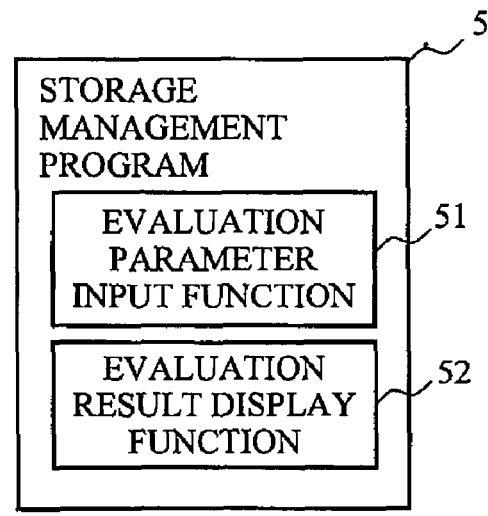
FIG. 14 is a diagram showing the configuration the data and functions included in a management computer 4 in the first embodiment.

FIG. 14 is a diagram showing the configuration of the data and functions included in the management computer 4. The management computer 4 includes the evaluation parameter input function 51 and the evaluation result display function 52 as storage management programs 5. These functions operate, collaborating with the control units that are not shown in the figures in the management computer 4 (such as CPUs), as the evaluation parameter input processing unit and the evaluation result display processing unit.

Figure 15:
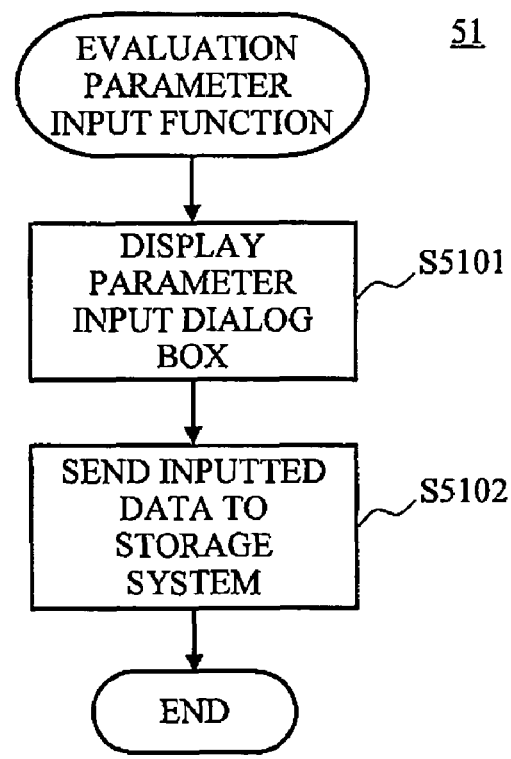
FIG. 15 is a flowchart (example) showing the processing details of an evaluation parameter input function 51 in the first embodiment.

Processing Details of the Evaluation Parameter Input Function and the Evaluation Result Display Function FIG. 15 is a flowchart (example) showing the processing details of the evaluation parameter input function 51. The processing of this function is sequentially described below.

By this function, firstly, the evaluation parameter input processing unit 51 displays the parameter input dialog box on the screen (S5101). Then the evaluation parameter input processing unit 51, with the input by the administrator, transmits the input parameter to the storage system 1 (S5102) and completes the processing.

Figure 16:
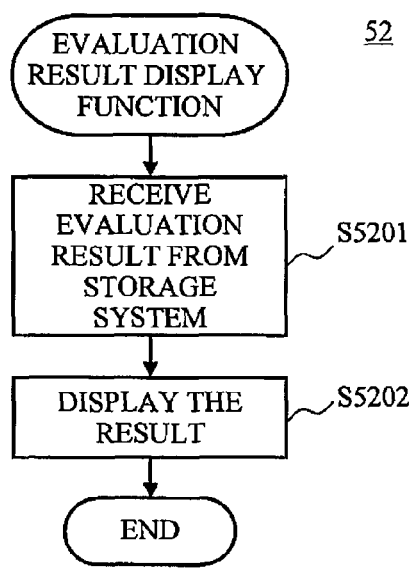
FIG. 16 is a flowchart (example) showing the processing details of an evaluation result display function 52 in the first embodiment.

FIG. 16 is a flowchart (example) showing the processing details of the evaluation result display function 52. The processing of this function is sequentially described below.

By this function, firstly, the evaluation result display processing unit 52 receives the evaluation result from the storage system 1 (S5201). Then evaluation result display processing unit 52 displays the result on the screen (S5201) and completes the processing.

Figure 17:
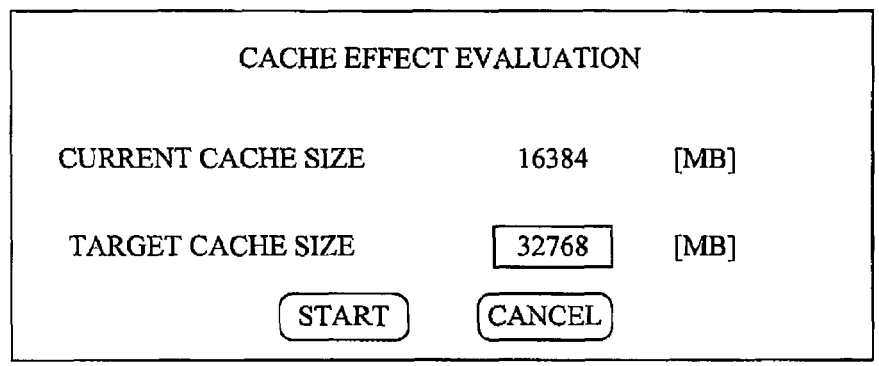
FIG. 17 is a diagram showing an example of the screen displayed by the evaluation parameter input function 51 in the first embodiment.

FIG. 17 is a diagram showing an example of the screen displayed by the evaluation parameter input function 51. The current cache capacity shows the capacity of the cache memory units currently installed in the storage system 1. The target cache capacity is input by the administrator and shows the capacity of the cache memory to be evaluated. This example shows the case where 16384 megabytes of the cache memory is currently installed in the storage system 1 and the effect of 32768 megabytes of cache memory capacity is to be evaluated.

FIG. 18 is a diagram showing an example of the screen displayed by the evaluation result display function 52. In FIG. 18, for the current cache memory capacity and the target cache memory capacity, the numbers of I/Os and the ratios of each type are displayed. This example, by the additional installation for making the current 16384 megabytes of cache memory into 32768 megabytes, shows that the cache hit rate can be improved from 44.7% to 68.2%.

Note that, though this embodiment shows the case where the target capacity is larger than the actual capacity, the effect of a case where the target capacity is kept smaller than the actual capacity and the cache memory capacity is reduced can also be estimated.

Conclusion of the First Embodiment

As described above, according to the first embodiment of this invention, the change of the cache hit rate when the cache memory capacity is increased or reduced in a storage system can be calculated. In this case, no actual additional installation or removal of cache memory is required.

Furthermore, as the calculation is executed using the I/O patterns in the actual operation environment, the precision is extremely high. Therefore, the administrator can easily ascertain the effect of additional installation or removal of cache memory. As a result, the burden on the administrator can be reduced.

Second Embodiment

This embodiment relates to an example where, in the calculation system configured of a storage system and a management computer, if the administrator issues a command for the effect evaluation of additional installation or removal of cache memory, the storage system obtains the change of the cache hit rate due to the increase or decrease of cache memory, and reports it to the administrator. Unlike the first embodiment, the administrator does not explicitly specify the target capacity but the storage system obtains the cache hit rates for multiple candidate cache memory capacities. The details are described below, using the attached figures by focusing on the differences from the first embodiment.

Contents of the Cache Directory Table and the LRU List Table

FIG. 19 is a diagram showing an example of a cache directory table 21 in this embodiment. In this embodiment, compared with FIG. 5, the information on the LRU position 216 is included. This information is used for ascertaining where in the LRU list table 22 the data corresponding with each entry exists.

FIG. 20 is a diagram showing an example of the LRU list 22 in this embodiment. The list table 22 in this embodiment does not have to include a virtual LRU as in the first embodiment. Furthermore, by specifying the number of entries in the LRU list table 22 as the number of entries corresponding with the largest of the candidate cache memory capacities, cache processing for all the candidates is made possible.

Contents of the I/O Counter Table

FIG. 21 is a diagram showing an example of an I/O counter table 23 in this embodiment. In the I/O counter table 23 in this embodiment, the number of I/Os is recorded classified by the LRU positions when referenced, instead of cache hits/misses. The I/O type 2310 shows whether the value shown by the counter is a read request or a write request from the host computer 71. The referenced LRU position 2311 shows to which range of the LRU list table 22 the value shown by the counter has been addressed. The number of I/Os 2312 is the number of I/Os corresponding with the I/O type 2310 and the referenced LRU position 2311.

The example of FIG. 21 shows that, as a result of counting the number of I/Os for a specific length of time, the number of read I/Os in the range from 0 to 1023 in the LRU list table 22, that is, 1024 blocks from the head is 76845.

Processing Details of the Host Read Function

Figure 22:
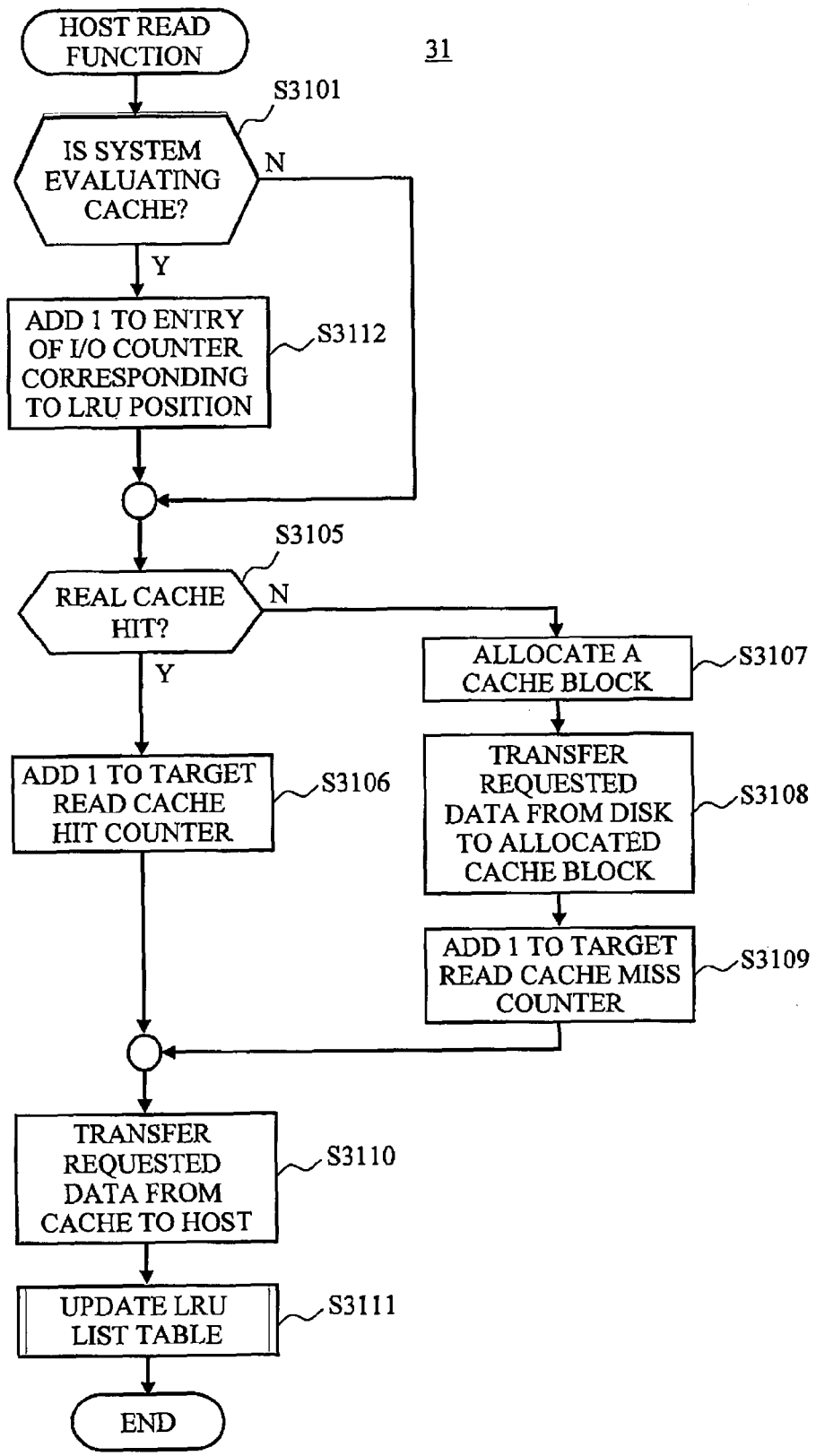
FIG. 22 is a flowchart (example) showing the processing details of the host read function 31 in the second embodiment.

FIG. 22 is a flowchart (example) showing the processing details of the host read function 31 in this embodiment.

In this embodiment, the host read processing unit 31, if it determines that the system is evaluating cache (i.e. S3101 is true), adds 1 to the corresponding entry in the I/O counter table 23 (FIG. 21) (S3112). For example, if the requested data is at the 3000th position in the LRU list, 1 is added to the I/O counter table type READ and the referenced LRU position 2048 to 3071.

The description on the processing of the steps with the same referenced numerals as in FIG. 9 is omitted as they are the same processing steps as those in FIG. 9.

Processing Details of the Host Write Function

Figure 23:
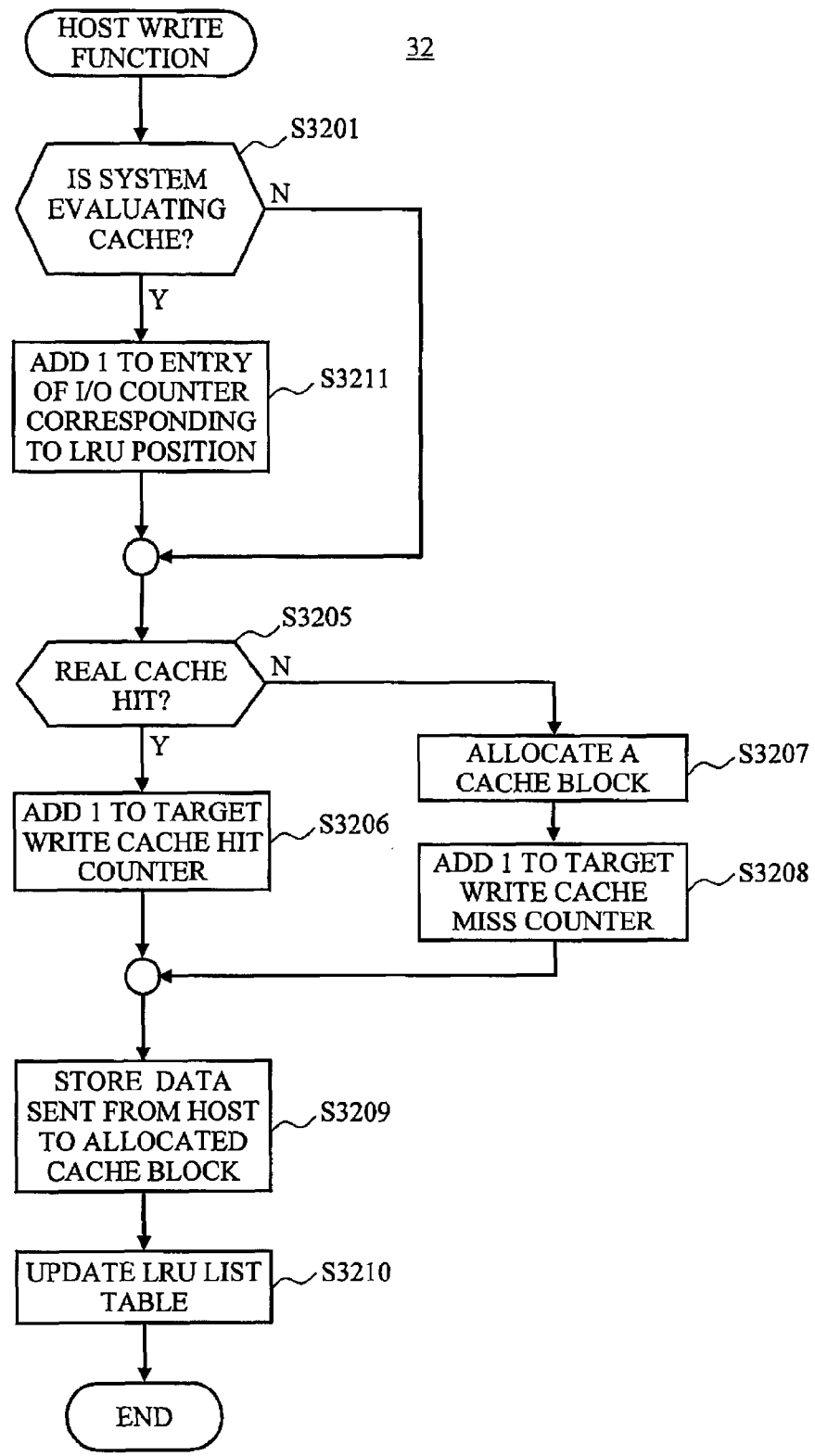
FIG. 23 is a flowchart (example) showing the processing details of the host write function 32 in the second embodiment.

FIG. 23 is a flowchart (example) showing the processing details of the host write function 32 in this embodiment.

In this embodiment, the host write processing unit 32, if it determines that the system is evaluating cache (i.e. S3201 is true), adds 1 to the corresponding entry in the I/O counter table 23 (S3211). For example, if the requested data is at the 4000th position in the LRU list, 1 is added to the I/O counter table type WRITE and the referenced LRU position 3072 to 4095.

The description on the processing of the steps with the same referenced numerals as in FIG. 10 is omitted as they are the same processing steps as those in FIG. 10.

Processing Details of the LRU List Update Function

Figure 24:
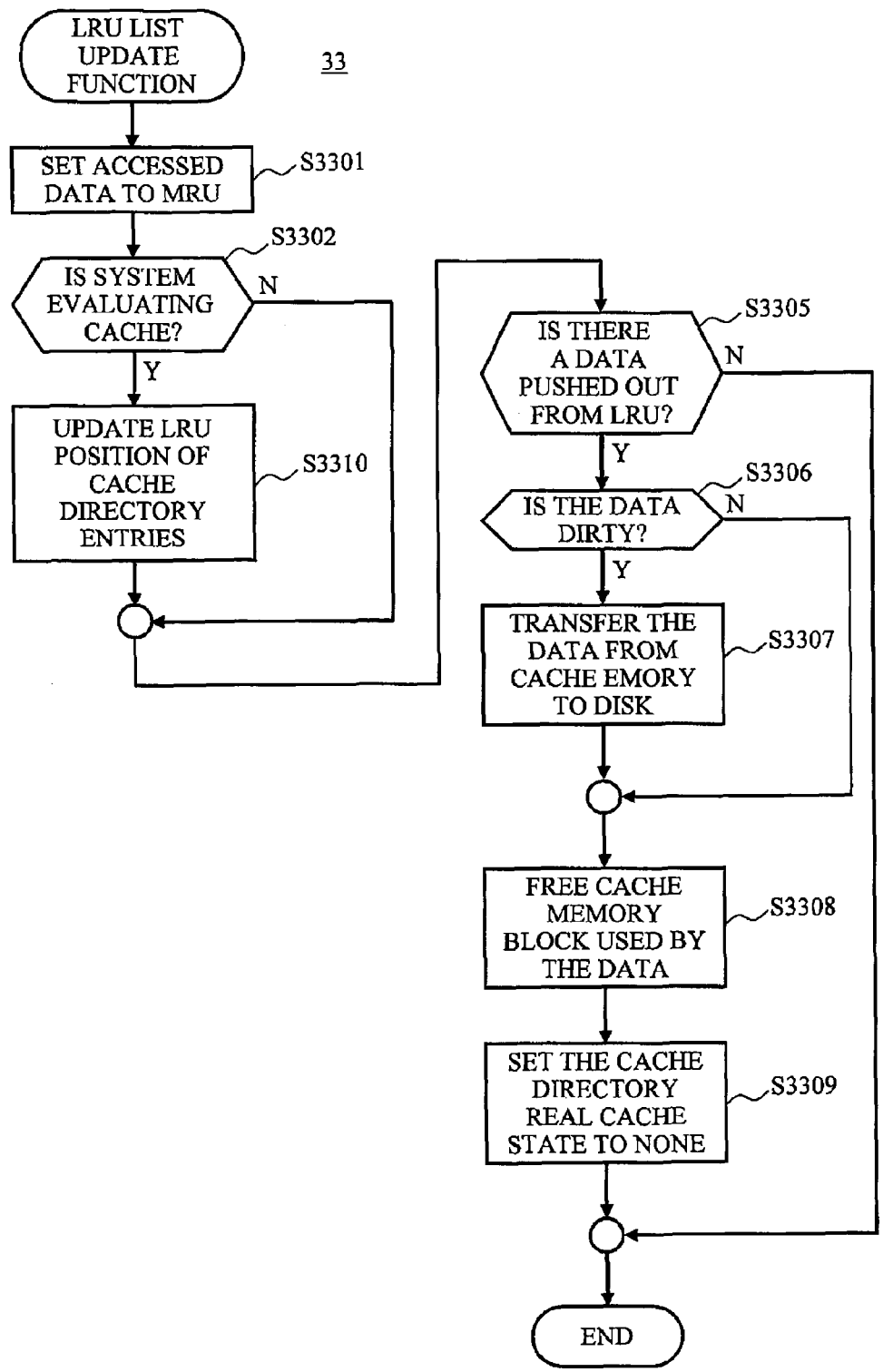
FIG. 24 is a flowchart (example) showing the processing details of the LRU list update function 33 in the second embodiment.

FIG. 24 is a flowchart (example) showing the processing details of the LRU list update function 33 in this embodiment. In this embodiment, the LRU list update function processing unit 33, if it determines that the system is evaluating cache (i.e. S3302 is true), updates the LRU list position 216 in the cache directory table 21. Specifically, among the entries in the cache directory table 21, for the entry whose position has been changed in the LRU list table 22 in S3301, the LRU list position 216 of the cache directory table 21 is changed to a new position. The description on the processing of the steps with the same referenced numerals as in FIG. 11 is omitted as they are the same processing steps as those in FIG. 11.

Processing Details of the Evaluation Start Function

Figure 25:
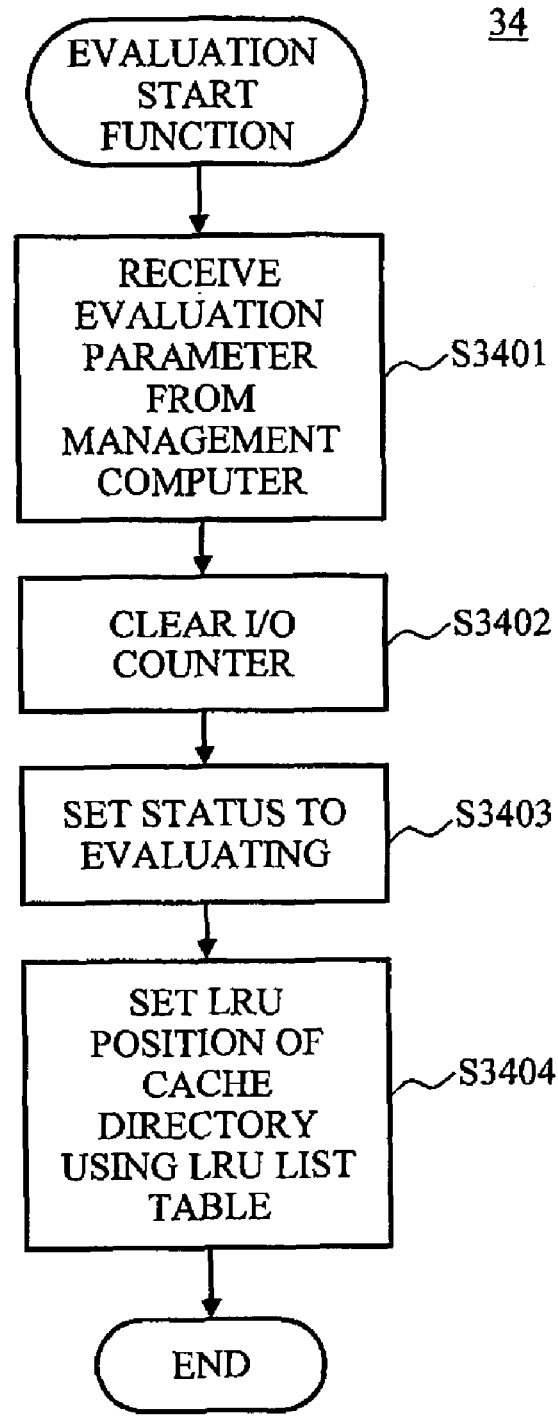
FIG. 25 is a flowchart (example) showing the processing details of the evaluation start function 34 in the second embodiment.

FIG. 25 is a flowchart (example) showing the processing details of the evaluation start function 34 in this embodiment. The evaluation start function 34 in this embodiment, in addition to the steps from S3401 to S3403 (refer to FIG. 12) in the first embodiment, the new step of referring to the LRU list table 22 and initializing the LRU position 216 in the cache directory table 21 (S3405) are included.

Figure 26:
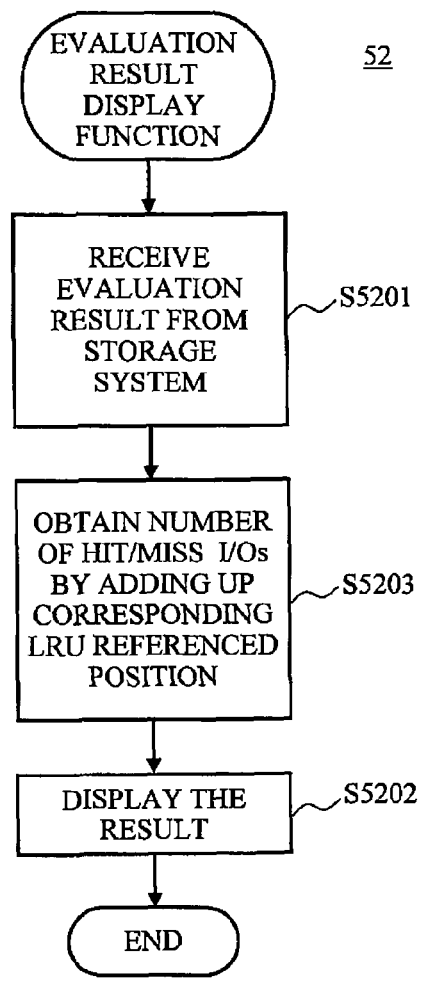
FIG. 26 is a flowchart (example) showing the processing details of the evaluation result display function 52 included in the management computer 4 in the second embodiment.

Processing Details of the Evaluation Parameter Input Function and the Evaluation Result Display Function FIG. 26 is a flowchart (example) showing the processing details of the evaluation result display function 52 included in the management computer 4 in this embodiment.

By this function, firstly, the evaluation result display processing unit 52 receives the evaluation result from the storage system 1 (S5201).

Next, the evaluation result display processing unit 52 obtains the number of hit/miss I/Os with each cache capacity assumed (S5203). Specifically, by dividing the target cache memory capacity by the cache block size, the number of corresponding cache memory blocks is obtained. The number of accesses to the referenced LRU positions corresponding to the number of blocks is considered to be the number of cache hit I/Os. For example, if the number of cache memory blocks is 2048, the number of I/Os to the referenced LRU positions from 0 to 1023 is 76845 and the number to the positions from 1024 to 2047 is 13246, the number of hit I/Os can be calculated by 76845+13246=90091. By this method, the number of hit/miss I/Os for each cache memory capacity can be obtained.

Finally, the evaluation result display processing unit 51 displays the calculation result (S5202), and completes the processing.

Note that, as for the evaluation parameter input function 51, the processing is the same as in the first embodiment (refer to FIG. 15).

Figure 27:
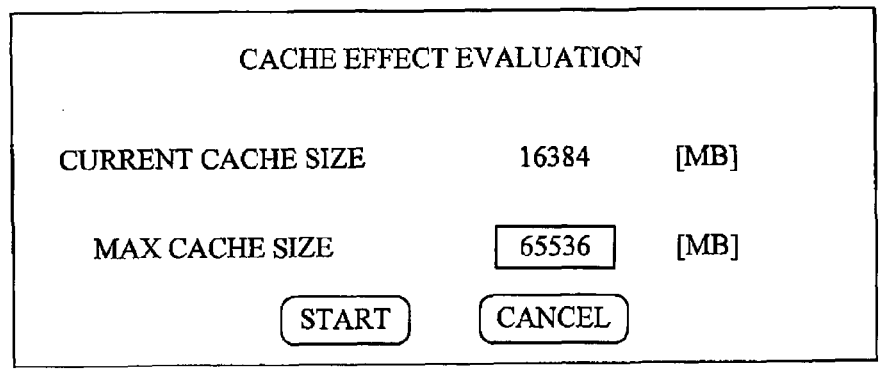
FIG. 27 is a diagram showing an example of the screen displayed by the evaluation parameter input function 51 in the second embodiment.

FIG. 27 is a diagram showing an example of the input screen displayed by the evaluation parameter input function 51 in this embodiment. This embodiment makes the administrator input the upper limit of the cache capacity range with the target hit rate. Obviously, other methods may also be permitted such as making the administrator input the lower limit or select multiple candidates.

FIG. 28 is a diagram showing an example of the screen displayed by the evaluation result display function 52 in this embodiment. This example shows the changes of the cache hit rate for multiple cache memory capacities. By this example, the administrator can ascertain that, while the total hit rate is 19.8% if the cache memory capacity is 8192 megabytes, the total hit rate can be 44.7% by making the capacity 16384 megabytes, or 68.2 by 32768 megabytes, though the rate increases only up to the 70.2% in spite of making the capacity 65536 megabytes.

Conclusion of the Second Embodiment

As described above, according to the second embodiment of this invention, the effect of additional installation and removal of cache memory can be acquired without the administrator specifying a cache memory capacity. For example, the administrator, when determining on additional installation or removal of cache memory, can obtain the required information by a single evaluation only, which eases the determination on additional installation and removal, and the burden on the administrator is reduced.

Third Embodiment

This embodiment relates to an example where, in the information processing system configured of a storage system 1 and a management computer 4, if the administrator specifies a certain cache memory capacity, the storage system obtains the peak performance of the system and reports it to the administrator. The details are described below, using the attached figures and focusing on the differences from the first embodiment.

Figures 29, 30:
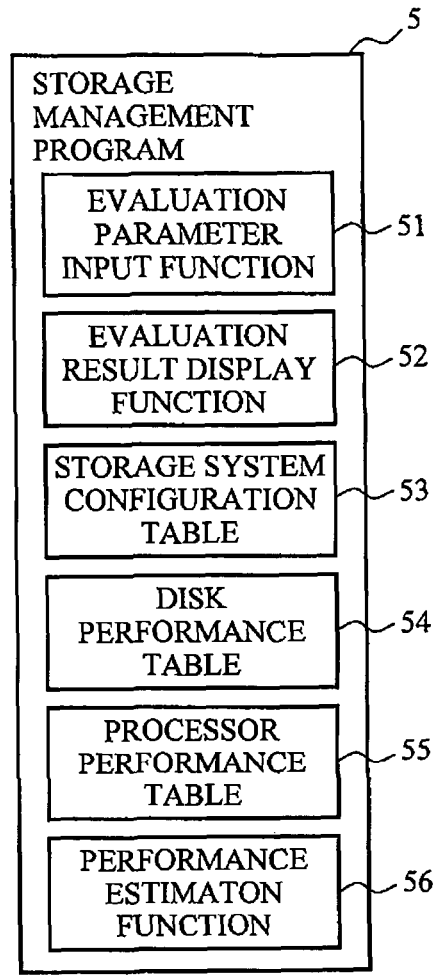
FIG. 29 is a diagram showing the configuration of the storage control program 5 included in the management computer 4 in the third embodiment.
FIG. 30 is a diagram showing an example of the storage configuration table 53 in the third embodiment.

Configuration of the Storage Management Program and the Contents of Various Types of Data FIG. 29 is a diagram showing the configuration of the storage control program 5 included in the management computer 4 in this embodiment. The storage management program 5, in addition to the evaluation parameter input function 51 and the evaluation result display function 52, newly includes a storage configuration table 53, a disk performance table 54, a processor performance table 55 and a performance estimation function 56. As in the second embodiment, these functions operate, collaborating with the control units (such as CPUs) that are not shown in the figures in the management computer 4 as the relevant processing units.

FIG. 30 is a diagram showing an example of the storage configuration table 53. The relevant table stores the numbers of resources in the storage system 1 both for the configuration of the current storage system 1 and for the configuration which is the target of the performance estimation. This table is referred to when the performance estimation function 56 requires the peak performance of the storage system 1. The number of processors 531 shows the number of processors in the storage system 1. The number of disks of type A 532 shows the number of disks of type A in the storage system 1. Similarly, the number of disks of type B 533 shows the number of disks of type B in the storage system 1. Though this example sets the number of disk types to two, more disk types may also be permitted.

FIG. 31 is a diagram showing an example of the disk performance table 54. The relevant table stores the performance per disk. For example, this figure shows that a disk of type A can process 200 I/Os per second. Similarly, it shows that a disk of type B can process 150 I/Os per second.

FIG. 32 is a diagram showing an example of the processor performance table 55. This table shows the amount of time required for the processor to process one I/O, classified by I/O types. This table is referred to by the performance estimation function 56.

In FIG. 32, the processing time in read hit 551 shows the amount of time required for the processor to process one read request from the host computer 71 when the access is a cache hit. The processing time in read miss 552 shows the amount of time required for the processor to process one read request from the host computer 71 when the access is a cache miss (i.e. the processing of, when there is no data to read in the cache, saving a free area in the cache, transferring the relevant data from the storage to the free area and transmitting the data back to the host). The processing time in write hit 553 shows the amount of time required for the processor to process one write request from the host computer 71 when the access is a cache hit. The processing time in write miss 554 shows the amount of time required for the processor to process one write request from the host computer 71 when the access is a cache miss (i.e. the processing of, when the original data is not in the cache, saving a free area in the cache and transferring the relevant data from the storage to the free area).

Figure 33:
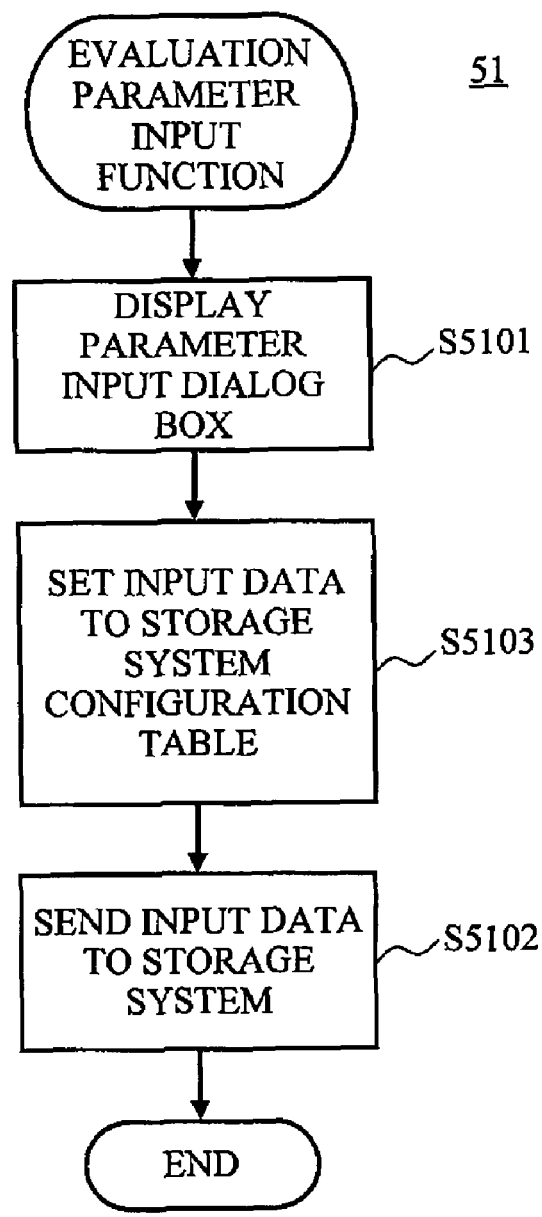
FIG. 33 is a flowchart (example) showing the processing details of the evaluation parameter input function 51 in the third embodiment.

Processing Details of the Evaluation Parameter Input Function and the Evaluation Result Display Function FIG. 33 is a flowchart showing the processing details of the evaluation parameter input function 51 in this embodiment. This embodiment, in addition to the steps S5101 and S5102 (refer to FIG. 15), newly includes the step S5103 in which the evaluation parameter input processing unit 51 stores the input data in the storage system configuration table 53.

Figure 34:
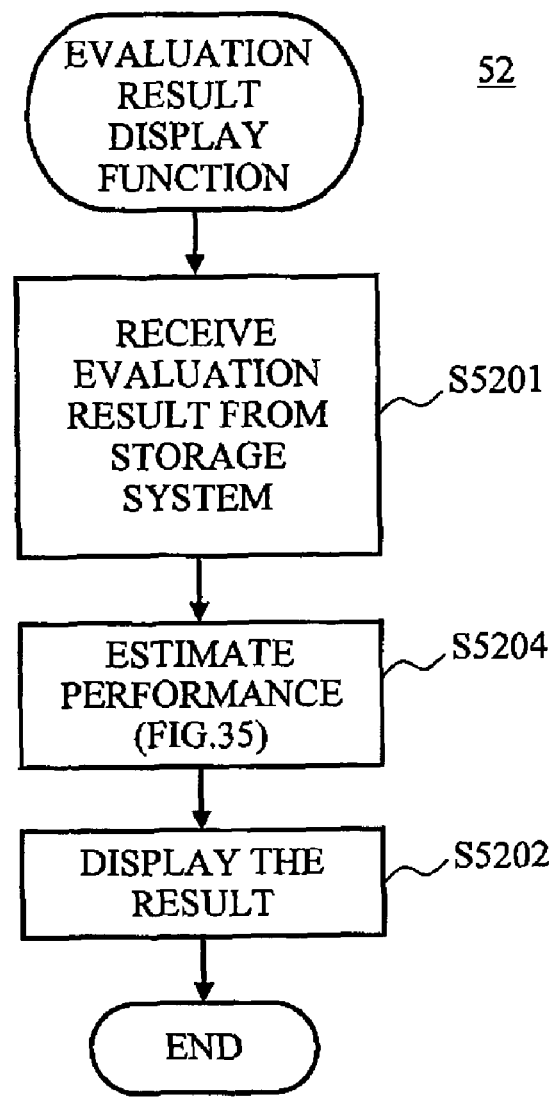
FIG. 34 is a flowchart (example) showing the processing details of the evaluation result display function 52 in the third embodiment.

FIG. 34 is a flowchart showing the processing details of the evaluation result display function 52 in this embodiment. This embodiment, in addition to the steps S5201 and S5202 (refer to FIG. 16), newly includes the step S5204 in which the evaluation result display processing unit 52 estimates the performance.

Processing Details of the Performance Estimation Function

Figure 35:
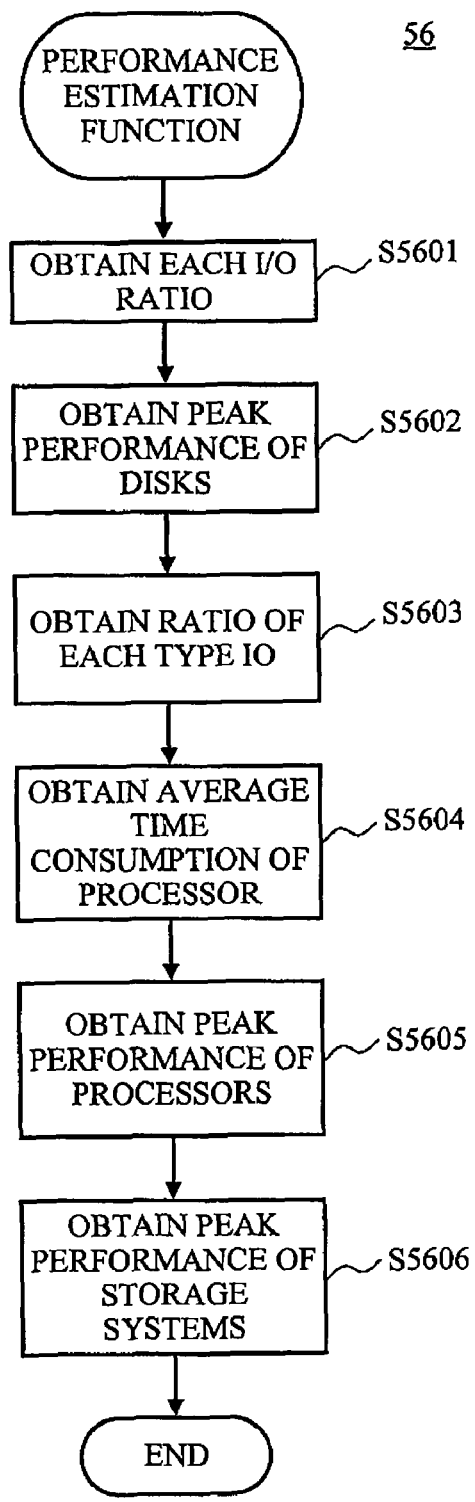
FIG. 35 is a flowchart (example) showing the processing details of the performance estimation function 56 (S5204) in the third embodiment.

FIG. 35 is a flowchart showing the processing details of the performance estimation function 56 (S5204). This function estimates the peak performance of the storage system 1 from the evaluation result of the storage system 1. This function is invoked by the evaluation result display function 52. The processing details of this function are sequentially described below. Note that the following description is made for the current configuration and the target configuration respectively.

In this function, firstly, the performance estimation processing unit 56 obtains the ratio of each I/O (S5601). Specifically, it is obtained by, using the evaluation result received from the storage system 1, dividing the number of I/Os of each type by the total number of I/Os.

Next, the performance estimation processing unit 56 obtains the host I/O peak performance that a disk can process (S5602). Specifically, for each of the disk types, the host I/O peak performance is obtained by dividing the product of the disk I/O performance stored in the disk performance table 54 and the number of disks 532 stored in the storage configuration table 53 by the cache miss rate obtained in S5601 i.e. the sum of the read miss rate and the write miss rate.

Furthermore, the performance estimation processing unit 56 obtains the average amount of time consumed by the processor for one I/O (S5604). Specifically, it is obtained by calculating the weighted average of each field in the processor performance table 55 using the ratio of each I/O obtained in S5601.

Furthermore, the performance estimation processing unit 56 obtains the peak performance of processors (S5605). Specifically, by dividing the number of processors 531 in the storage configuration table 53 by the average amount of time per I/O calculated in S5604, the number of I/Os that can be processed per second can be obtained.

Finally, the performance estimation processing unit 56 obtains the peak performance of the storage system 1 (S5606). Specifically, the smaller of the peak performance of disks obtained in S5602 and the peak performance of processors obtained in S5605 is considered to be the peak performance of the storage system 1.

Evaluation Parameter Input Screen and Evaluation Result Display Screen

FIG. 36 is a diagram showing an example of the screen displayed by the evaluation parameter input function 51 in this embodiment. In this embodiment, in addition to the fields shown in FIG. 17, the number of disks classified by disk types and the number of processors are newly included in the input screen. This example calculates the peak performance with 32768 megabytes of cache memory, 128 disks of type A, 64 disks of type B, and 64 processors.

FIG. 37 is a diagram showing an example of the screen displayed by the evaluation result display function 52 in this embodiment. The relevant evaluation result screen displays the peak performance with both the change of the cache hit rate due to the change of the cache capacity and the change of the number of processors and disks taken into consideration. This example shows that, in the current configuration, the processors are the bottlenecks of the performance which have limited the value up to 40865 IOPS, and that additional installation of resources increased the value up to 84719 IOPS.

Conclusion of the Third Embodiment

As described above, according to the third embodiment of this invention, the administrator can ascertain the performance of a storage system directly if the configuration of the storage system has been changed. Furthermore, as the peak performance of processors and disks changes depending on the increase and decrease of the cache hit rate, the administrator can obtain the peak performance taking these influences into consideration. As a result, the burden on the administrator is reduced.

Note that, though this embodiment has given processors and disks as components that can be additionally installed or removed, for the other components in the storage system 1 such as host interfaces and disk interfaces, the effect of additional installation or removal can also be evaluated by the same method.

Fourth Embodiment

The fourth embodiment relates to an example of, in the information processing system configured of a storage system 1 and a management computer 4, if the administrator specifies a certain target performance, obtaining the method for achieving the peak performance at the lowest cost, and reporting it to the administrator. The details are described below, using the attached figures and focusing on the differences from the second and third embodiments.

Figure 38:
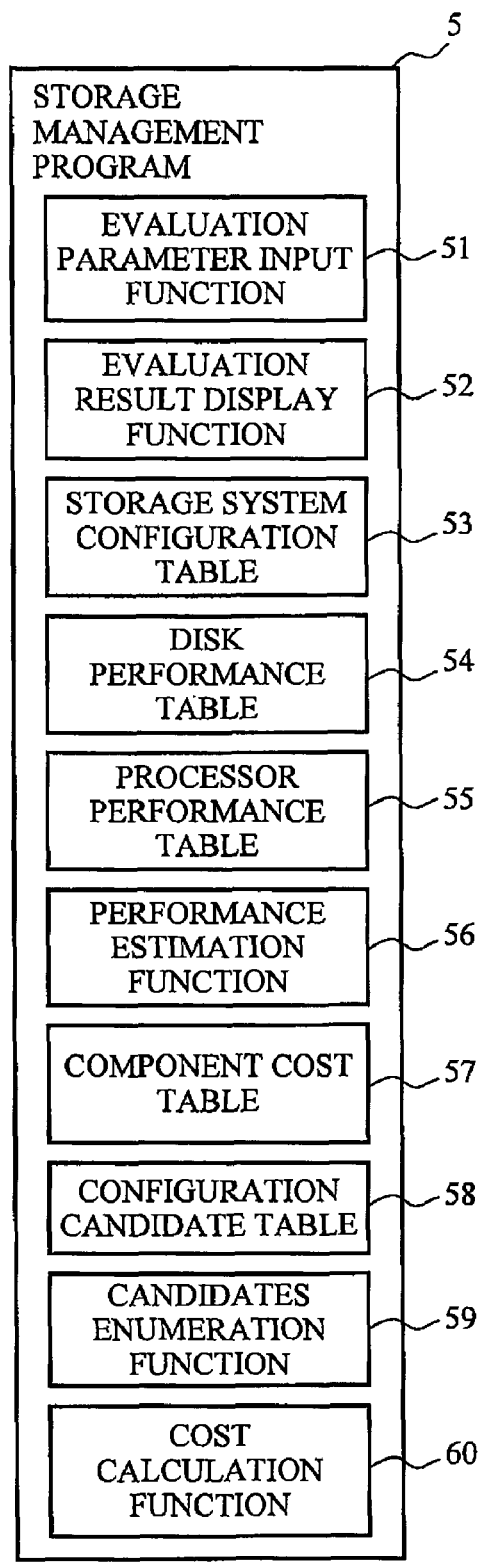
FIG. 38 is a diagram showing the breakdown of the storage control program 5 in the fourth embodiment.

Configuration of the Storage Management Program and the Contents of Various Types of Data FIG. 38 is a diagram showing the configuration of the storage control program 5 in this embodiment. This embodiment, in addition to the configuration shown in FIG. 29, newly includes a component cost table 57, a candidate configuration table 58, a candidate enumeration function 59 and a cost calculation function 60. As in the second and third embodiments, these functions operate, collaborating with the control units that are not shown in the figures in the management computer 4 (such as CPUs), as the relevant processing units.

FIG. 39 is a diagram showing an example of the component cost table 57. This table stores the costs of the components that can be additionally installed or removed in the storage system 1. This table is referred to by the cost calculation function 60.

In FIG. 39, the processor price 571 is the purchase expense per processor. The price of a disk type A 572 is the purchase expense per disk type A. The price of a disk type B 573 is the purchase expense per disk type B. The price of cache memory 574 is the purchase expense per cache memory in units of capacity.

FIG. 40 is a diagram showing an example of the candidate configuration table 58. For each cache capacity, this table stores the number of resources of the other components required for achieving the target performance. This table is created and referred to by the candidate enumeration function 59 and the cost calculation function 60.

In FIG. 40, the cache memory capacity 581 shows which cache memory capacity each row of the table corresponds with. The number of required processors 582 shows the number of processors required for achieving the target performance for the cache memory capacity 581. The number of required disks 583 and 584 is the number of disks of all the types for achieving the target performance for the cache memory capacity 581. The additional cache memory capacity 585 is the cache memory capacity to be additionally installed or removed for realizing the configuration stated in 581. Similarly, the number of additional processors 586 is the number of processors to be additionally installed or removed for realizing the configuration stated in 582. The number of additional disks 587 and 588 is also the number of disks to be additionally installed or removed for realizing the configuration stated in 583 and 584. The extra cost 589 is the expense required for adding resources stated in 585 to 588.

Processing Details of the Evaluation Result Display Function

Figure 41:
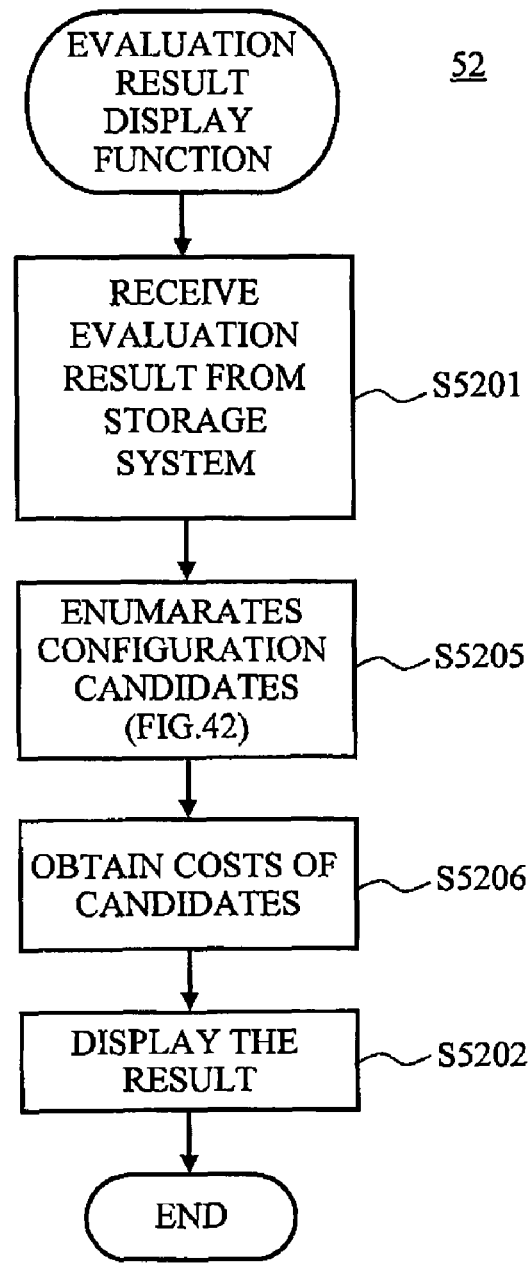
FIG. 41 is a flowchart (example) showing the processing details of the evaluation result display function 52 in the fourth embodiment.

FIG. 41 is a flowchart showing the processing details of the evaluation result display function 52 in this embodiment. In this embodiment, in addition to the processing of the steps S5201 and S5202, the additional candidate enumeration function S5205 and the cost calculation function for all the candidates S5206 are newly executed.

Processing Details of the Candidate Enumeration Function

Figure 42:
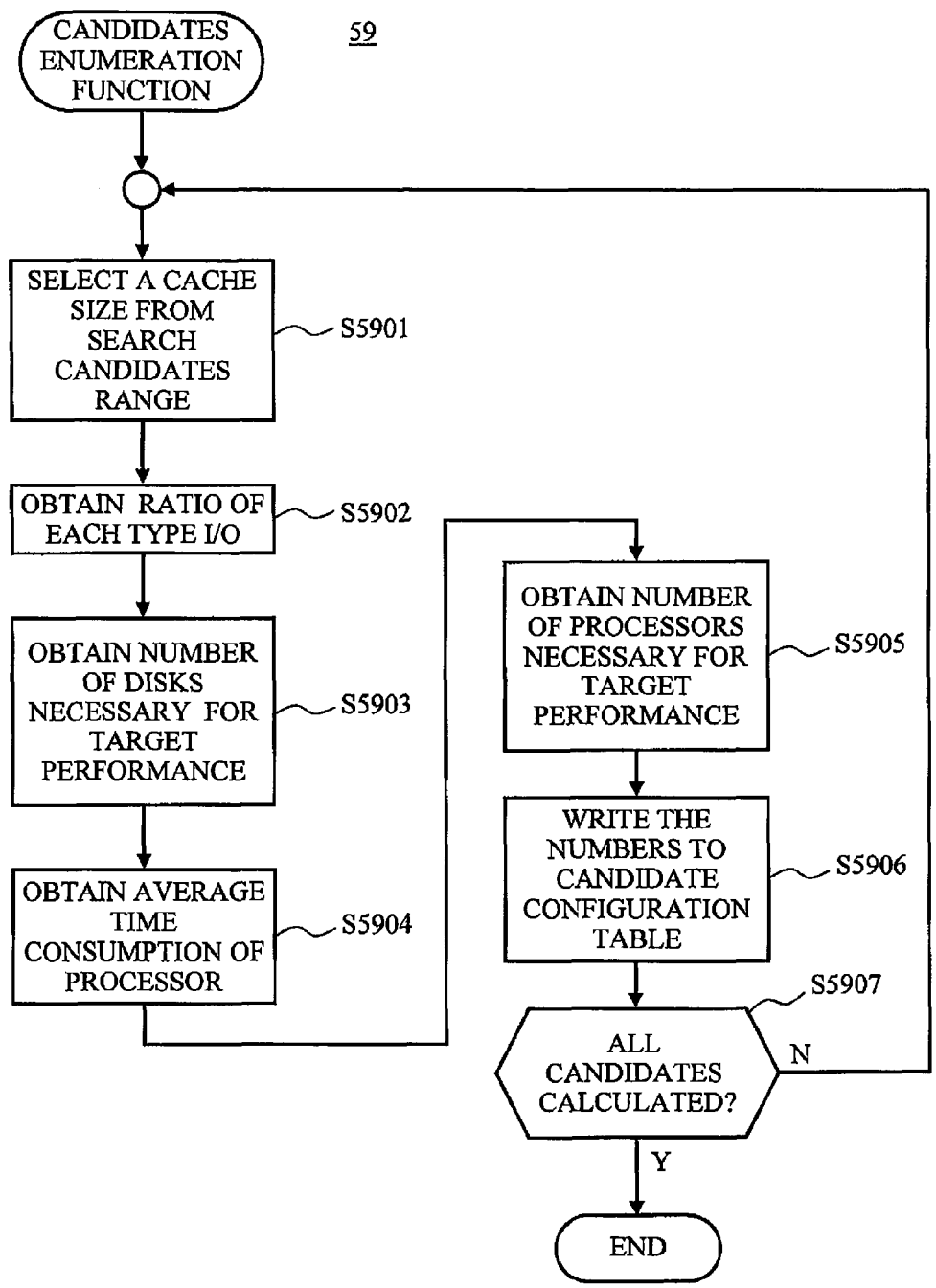
FIG. 42 is a flowchart (example) showing the processing details of the candidate enumeration function 59 (S5205) in the fourth embodiment.

FIG. 42 is a flowchart showing the processing details of the candidate enumeration function 59 (S5205). This function creates a table in FIG. 40, obtains the number of required processors and disks for multiple cache memory capacities, and stores them in the candidate configuration table 58. This function is invoked by the evaluation result display function 52. The processing of this function is sequentially described below.

In this function, firstly, the candidate enumeration processing unit 59 selects a cache memory capacity from among the candidate cache memory capacities (S5901). The candidate cache memory capacities can be all the capacities that can be realized by the storage system 1 or they can also be specified by the administrator.

Next, the candidate enumeration processing unit 59 obtains the ratio of each I/O (S5902). Specifically, as in S5203 of the second embodiment, the number of I/Os per read/write and hit/miss, and then, as in S5601 of the third embodiment, the ratio of each type of I/Os can be obtained.

Furthermore, the candidate enumeration processing unit 59 obtains the number of disks required for achieving the target performance (S5903). Specifically, the peak performance that can be achieved by the number of currently installed disks is obtained. Specifically, it can be obtained by multiplying the disk performance stated in the disk performance table 54 per type by the number of disks stated in the storage configuration table 53, and dividing the sum of all such products by the cache miss rate. Next, the number of disks required for compensating for the insufficient performance. That is, the product of the difference between the target performance and the current disk peak performance and the cache miss rate is divided by the disk I/O performance stored in the disk performance table 54. At this time, the disk type is the one input by the administrator by the evaluation parameter input function 51 which is described later. Note that, in the step S5903, if the storage system supports one disk type for additional installation, the processing is simply that the product of the target performance of that disk type and the cache miss rate is divided by the disk I/O performance stored in the disk performance table 54.

Next, the candidate enumeration processing unit 59 obtains the average amount of time consumed by the processor per I/O (S5904). Specifically, it is obtained by calculating the weighted average of each field in the processor performance table 55 using the ratio of each I/O obtained in S5902.

The candidate enumeration processing unit 59 then obtains the number of processors (S5905). Specifically, it is obtained by multiplying the target performance and the average amount of time required per second.

Furthermore, the candidate enumeration processing unit 59 writes the required number of resources obtained in S5903 and S5905 in the required number of resources 582 and 583 in the candidate configuration table (S5906).

The candidate enumeration processing unit 59 repeats the above-mentioned processing for all the candidate cache memory capacity (S5907).

Processing Details of the Cost Calculation Function

Figure 43:
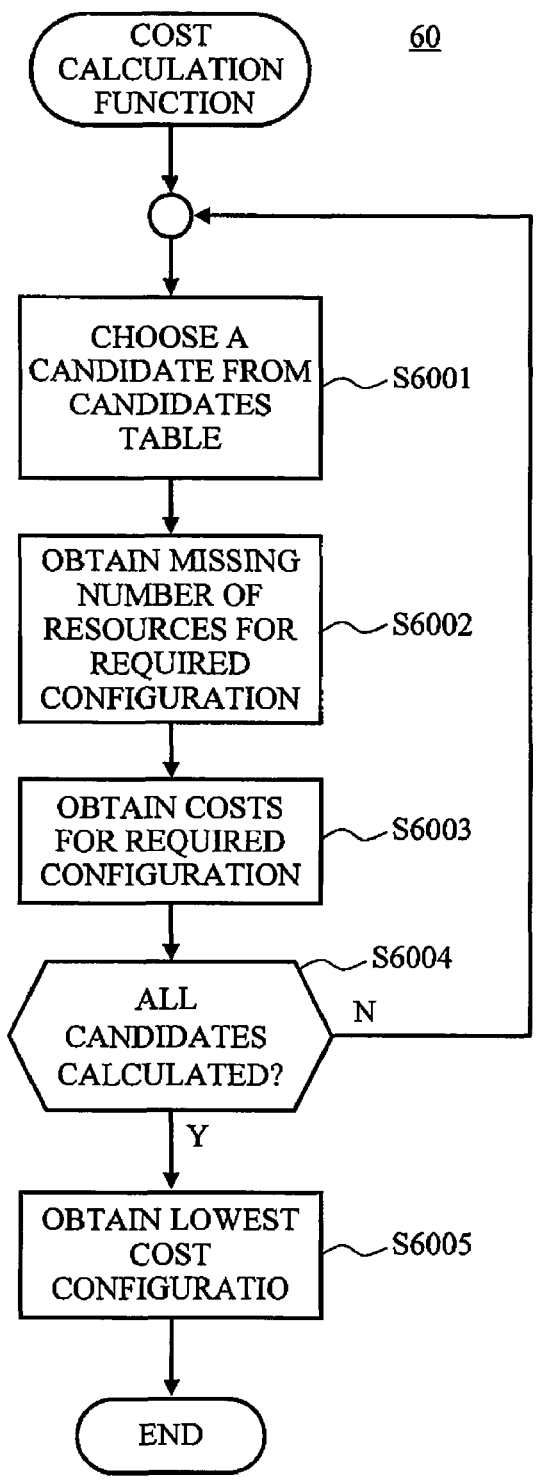
FIG. 43 is a flowchart (example) showing the processing details of the cost calculation function 60 (S5206) in the fourth embodiment.

FIG. 43 is a flowchart showing the processing details of the cost calculation function 60 (S5206). This function obtains the number of additionally installed resources from the required number of resources described in the candidate configuration table 58 and obtains the cost required for achieving it. This function is invoked by the evaluation result display function 52. The processing of this function is sequentially described below.

In this function, the cost calculation processing unit 60 selects one from among candidate cache memory capacities (S6001).

Next, the cost calculation processing unit 60 compares the required number of resources with the configuration of the current storage system and obtains the number of additionally required resources (S6002).

Then the cost calculation processing unit 60, with reference to the number of additionally required components and the contents of the component cost table 57, obtains the cost for the required configuration (S6003).

The cost calculation processing unit 60 repeats the above-mentioned processing for all the candidate cache memory capacities (S6004).

After the calculations for all the cache memory capacities are completed, the cost calculation processing unit 60 obtains the one with the lowest cost (S6005), and completes the processing.

Evaluation Parameter Input Screen and Evaluation Result Display Screen

FIG. 44 is a diagram showing an example of the screen displayed by the evaluation parameter input function 51 in this embodiment. The input screen in this embodiment includes the target performance field and the additional disk type field.

FIG. 45 is a diagram showing an example of the screen displayed by the evaluation result display function 52. This example shows that the additional installation in which 32768 megabytes of cache memory is added to make the total capacity 49152 megabytes, 2 processors are additionally installed to make total number 34, and 209 disks of type A are additionally installed to make the total number 337 costs additional $325,000, which is the least expensive.

Conclusion of the Fourth Embodiment

As described above, according to the fourth embodiment of this invention, the administrator can ascertain the required configuration for achieving the target performance only by inputting the target performance. As a result, the burden on the administrator is reduced.

On Other Embodiments

Note that, this invention may also be achieved by the programming codes of the software that achieves the functions in the above-mentioned embodiments. In this case, the storage media recording the programming codes is provided to the system or the device, and the computer (or a CPU or an MPU) of that system or the device reads the programming codes stored in the storage media. In this case, the programming codes read from the storage media themselves achieve the functions in the above-mentioned embodiments, and the programming codes themselves and the storage media that store them are considered to configure this invention. The storage media may provide such programming codes, for example, flexible disks. CD-ROMs, DVD-ROMs, hard disks, optical disks, magnetic optical disks, CD-Rs, magnetic tapes, non-volatile memory cards and ROMs.

Furthermore, it may be permitted that the OS (operating system) or other components operating in the computer, with reference to the commands of the programming codes, execute all or part of the actual processing, and by that processing, the functions in the above-mentioned embodiments are embodied. Another method may also be permitted that, after the programming codes read from the storage media have been written in the storage memory of the computer, with reference to the commands of the programming codes, the CPU or other components of the computer execute all or part of the actual processing, and by that processing, the functions in the above-mentioned embodiments are embodied.

Another method may also be permitted in which, by distributing via the Internet the programming codes that achieve the functions in the above-mentioned embodiments, they are stored in the storage means in the system or the device such as hard disks, or the storage media such as CD-RWs and CD-Rs, and when using the system, the computer (or the CPU or the MPU) of the system or the device reads the programming codes stored in the relevant storage means or the relevant storage media and executes them.

The invention claimed is:

1. An information processing system comprising:
   a storage system including a storage control program, processors, disk drives, cache memory, and an LRU list to manage the reference status to the data in the cache memory; and
   a management computer which is configured to transmit a request to the storage system for measuring the cache effect in a virtual capacity which is different from the actual capacity of the cache memory and which includes a storage management program for outputting a measurement result of the cache effect, wherein:
the storage control program, in response to the measurement request, is configured to create a first cache effect information regarding the I/O processing frequency by counting the I/O processing frequency in response to the I/O request when the cache memory has the virtual capacity, with reference to information of the LRU list, and to transmit the relevant first cache effect information to the management computer, and
the storage management program (5) is configured to output the first cache effect information,
wherein:
the I/O processing frequency is the number of cache hits and cache misses of the cache memory with the virtual capacity for the I/O request,
the storage system further includes a cache directory table, which has been created with reference to the LRU list, for managing the status of data stored in the disk drives in the cache memory,
the storage control program is configured to create the first cache effect information by executing the determination of cache hits and cache misses for the I/O request with reference to the cache directory table in the actual operational environment of the storage system,
the storage control program, in response to the measurement request, is configured to create a second cache effect information regarding the number of cache hits and cache misses when the cache memory has the actual capacity by executing the determination of cache hits and cache misses for the I/O request when the cache memory has the actual capacity with reference to the cache directory table in the actual operational environment of the storage system, and to count the number of cache hits and cache misses for the I/O request, and then transmit the first and second cache effect information to the management computer,
the storage management program is configured to compare the first cache effect information with the second cache effect information and output the result,
the management computer further includes performance tables that manage each performance of the processors and the disk drives in the storage system, the storage management program is configured to receive an input of information on the virtual number of processors and the virtual number of disk drives,
the storage management program is configured to calculate, for a combination of the cache memory with the actual capacity, the processors being actually used, and the disk drives being actually used, the peak performance of each of the processors and disk drives being actually used, with reference to the second cache effect information and information on each performance of the processors and the disk drives, and with reference to them, to calculate a first peak performance of the storage system in the current configuration,
the storage management program is configured to calculate, for a combination of the cache memory with the virtual capacity, the virtual number of processors, and the virtual number of disk drives, the peak performance of each of the processors and the disk drives in the virtual configuration of the storage system, with reference to the first cache effect information and the information on each performance of the processors and the disk drives, and with reference to them, to calculate a second peak performance of the storage system in the virtual configuration, and the storage management program is configured to compare the first peak performance with the second peak performance and output the result.

2. The information processing system according to claim 1, wherein:
the management computer further includes a component cost table that is configured to manage the unit cost information of each of the cache memory, the processors, and the disk drives,
the storage management program is configured to receive an input of information on the target performance of the storage system, and obtain the target storage configuration information including information on the capacity of the cache memory, the number of disk drives, and the number of processors required for achieving the target performance, with reference to the first cache effect information corresponding to the capacity of the cache memory, the storage management program is configured to calculate an increase and decrease of the cost required for achieving the target performance based on the target storage configuration information, with reference to the component cost table, and the storage management program is configured to output information on the calculated increase and decrease of the cost.

3. An information processing system comprising:
a storage system including a storage control program, processors, disk drives, cache memory, and an LRU list to manage the reference status to the data in the cache memory; and
a management computer which is configured to transmit a request to the storage system for measuring the cache effect in a virtual capacity which is different from the actual capacity of the cache memory and which includes a storage management program for outputting a measurement result of the cache effect, wherein:
the storage control program, in response to the measurement request, is configured to create a first cache effect information regarding the I/O processing frequency by counting the I/O processing frequency in response to the I/O request when the cache memory has the virtual capacity, with reference to information of the LRU list, and to transmit the relevant first cache effect information to the management computer, and
the storage management program is configured to output the first cache effect information,
wherein:
the storage system further includes a cache directory table, which has been created with reference to the LRU list, for managing the status of data stored in the disk drives in the cache memory, and the storage control program executes the determination of cache hits and cache misses for the I/O request with reference to the cache directory table.

4. An information processing system comprising:
a storage system including a storage control program, processors, disk drives, cache memory, and an LRU list to manage the reference status to the data in the cache memory; and
a management computer which is configured to transmit a request to the storage system for measuring the cache effect in a virtual capacity which is different from the actual capacity of the cache memory and which includes a storage management program for outputting a measurement result of the cache effect, wherein:
the storage control program, in response to the measurement request, is configured to create a first cache effect information regarding the I/O processing frequency by counting the I/O processing frequency in response to the I/O request when the cache memory has the virtual capacity, with reference to information of the LRU list, and to transmit the relevant first cache effect information to the management computer, and the storage management program is configured to output the first cache effect information, wherein:

the storage control program, in response to the measurement request, is configured to create a second cache effect information regarding the number of cache hits and cache misses when the cache memory has the actual capacity by counting the number of cache hits and cache misses for the I/O request when the cache memory has the actual capacity, with reference to the information of the LRU list, and to transmit the first and second cache effect information to the management computer, and the storage management program is configured to compare the first cache effect information with the second cache effect information and to output the result.

5. The information processing system according to claim 4, wherein the storage control program creates the first and second cache effect information by counting the number of cache hits and cache misses of the cache memory with the actual capacity and virtual capacity for the I/O request in the actual operational environment of the storage system.

6. The information processing system according to claim 4, wherein:

the management computer further includes performance tables that manage each performance of the processors and the disk drives in the storage system, and the storage management program is configured to calculate the peak performance of each of the processors and the disk drives with reference to the first and second cache effect information and the information on each performance of the processors and the disk drives, and with reference to them, to calculate the peak performance of the storage system.

7. The information processing system according to claim 6, wherein:

the storage management program is configured to receive an input of information on the virtual number of processors and the virtual number of disk drives, the storage management program is configured to calculate, for a combination of the cache memory with the actual capacity, the processors being actually used, and the disk drives being actually used, a first peak performance of the storage system in the current configuration, with reference to the second cache effect information and the information on each performance of the processors and the disk drives, the storage management program is configured to calculate, for a combination of the cache memory with the virtual capacity, the virtual number of processors, and the virtual number of disk drives, a second peak performance of the storage system in the virtual configuration, with reference to the first cache effect information and the information on each performance of the processors and the disk drives, and the storage management program is configured to compare the first peak performance with the second peak performance and to output the result.

8. An information processing system comprising:

a storage system including a storage control program, processors, disk drives, cache memory, and an LRU list to manage the reference status to the data in the cache memory; and a management computer which is configured to transmit a request to the storage system for measuring the cache effect in a virtual capacity which is different from the actual capacity of the cache memory and which includes a storage management program for outputting a measurement result of the cache effect, wherein:

the storage control program, in response to the measurement request, is configured to create a first cache effect information regarding the I/O processing frequency by counting the I/O processing frequency in response to the I/O request when the cache memory has the virtual capacity, with reference to information of the LRU list, and to transmit the relevant first cache effect information to the management computer, and the storage management program is configured to output the first cache effect information, wherein:

the management computer further includes a component cost table that is configured to manage the unit cost information of each of the cache memory, the processors and the disk drives, the storage management program (5) is configured to receive an input of information on the target performance of the storage system, and to obtain the target storage configuration information including information on the capacity of the cache memory, the number of disk drives, and the number of processors required for achieving the target performance, with reference to the first cache effect information corresponding to the capacity of the cache memory, the storage management program is configured to calculate an increase and decrease of the cost required for achieving the target performance based on the target storage configuration information, with reference to the component cost table, and the storage management program is configured to output information on the calculated increase and decrease of the cost.

9. The information processing system according to claim 8, wherein:

the storage management program is configured to obtain multiple pieces of target storage configuration information required for achieving the target performance corresponding with multiple candidates for the capacity of the cache memory, the storage management program is configured to calculate an increase and decrease of the cost corresponding with each of the multiple pieces of target storage configuration information, and the storage management program is configured to compare multiple pieces of information on the calculated increase and decrease of the cost with one another and to output the result.

10. The information processing system according to claim 9, wherein the storage management program, for achieving the target performance, is configured to output a target storage configuration whose total cost amounts to the smallest, distinguished from the other target storage configuration.

11. A method of processing information with an information processing system (100), wherein the information processing system includes a storage system including a storage control program, processors, disk drives, cache memory, and an LRU list to manage the reference status to the data in the cache memory, and also includes a management computer which is configured to transmit a request to the storage system for measuring the cache effect in a virtual capacity which is different from the actual capacity of the cache memory and which includes a storage management program for outputting a measurement result of the cache effect, the method comprising the steps of:

causing the storage control program in the storage system to, in response to the measurement request, create a first cache effect information regarding the I/O processing frequency by counting the I/O processing frequency in response to the I/O request when the cache memory has the virtual capacity, with reference to information of the LRU list, and to transmit the relevant first cache effect information to the management computer; and causing the storage management program in the management computer to output the first cache effect information, wherein the I/O processing frequency is the number of cache hits and cache misses of the cache memory with the virtual capacity for the I/O request, the storage system further includes a cache directory table, which has been created with reference to the LRU list, for managing the status of data stored in the disk drives in the cache memory, and the management computer further includes performance tables that manage each performance of the processors and the disk drives in the storage system, the method comprising the steps of:

causing the storage control program in the storage system to create the first cache effect information by executing the determination of cache hits and cache misses for the I/O request with reference to the cache directory table in the actual operational environment of the storage system;

causing the storage control program in the storage system to, in response to the measurement request, create a second cache effect information regarding the number of cache hits and cache misses when the cache memory has the actual capacity by executing the determination of cache hits and cache misses for the I/O request when the cache memory has the actual capacity with reference to the cache directory table in the actual operational environment of the storage system, and counting the number of cache hits and cache misses for the I/O request, and to transmit the first and second cache effect information to the management computer;

causing the storage management program in the management computer to compare the first cache effect information with the second cache effect information and to output the result;

causing the storage management program in the management computer to receive an input of information on the virtual number of processors and the virtual number of disk drives;

causing the storage management program in the management computer to calculate, for a combination of the cache memory with the actual capacity, the processors being actually used, and the disk drives being actually used, the peak performance of each of the processors and disk drives being actually used, with reference to the second cache effect information and information on each performance of the processors and the disk drives, and to calculate, with reference to them, a first peak performance of the storage system in the current configuration;

causing the storage management program in the management computer to calculate, for a combination of the cache memory with the virtual capacity, the virtual number of processors, and the virtual number of disk drives, the peak performance of each of the processors and the disk drives in the virtual configuration of the storage system, with reference to the first cache effect information and the information on each performance of the processors and the disk drives, and to calculate, with reference to them, a second peak performance of the storage system in the virtual configuration; and causing the storage management program in the management computer to compare the first peak performance with the second peak performance and to output the result.

12. A method of processing information with an information processing system, wherein the information processing system includes a storage system including a storage control program, processors, disk drives, cache memory, and an LRU list to manage the reference status to the data in the cache memory, and also includes a management computer configured to transmit a request to the storage system for measuring the cache effect in a virtual capacity which is different from the actual capacity of the cache memory and which includes a storage management program for outputting a measurement result of the cache effect, and the storage system further includes a cache directory table, which has been created with reference to the LRU list, for managing the status of data stored in the disk drives in the cache memory, the method comprising the steps of:

causing the storage control program in the storage system to, in response to the measurement request, create a first cache effect information regarding the I/O processing frequency by counting the I/O processing frequency in response to the I/O request when the cache memory has the virtual capacity, with reference to information of the LRU list, and to transmit the relevant first cache effect information to the management computer;

causing the storage management program in the management computer to output the first cache effect information; and, causing the storage control program in the storage system to execute the determination of cache hits and cache misses for the I/O request with reference to the cache directory table.

13. A method of processing information with an information processing system, wherein the information processing system includes a storage system including a storage control program, processors, disk drives, cache memory, and an LRU list to manage the reference status to the data in the cache memory, and also includes a management computer which is configured to transmit a request to the storage system for measuring the cache effect in a virtual capacity which is different from the actual capacity of the cache memory and which includes a storage management program for outputting a measurement result of the cache effect, the method comprising the steps of:

causing the storage control program in the storage system to, in response to the measurement request, create a first cache effect information regarding the I/O processing frequency by counting the I/O processing frequency in response to the I/O request when the cache memory has the virtual capacity, with reference to information of the LRU list;

causing the storage control program in the storage system to, in response to the measurement request, create a second cache effect information regarding the number of cache hits and cache misses when the cache memory has the actual capacity by counting the number of cache hits and cache misses for the I/O request when the cache memory has the actual capacity, with reference to the information of the LRU list, and to transmit the first and second cache effect information to the management computer.

* * * * *